(12) United States Patent
Bannai et al.

(10) Patent No.: US 6,836,633 B2
(45) Date of Patent: Dec. 28, 2004

(54) OPTICAL SCANNING DEVICE AND IMAGE FORMING APPARATUS INCLUDING THE OPTICAL SCANNING DEVICE

(75) Inventors: Kazunori Bannai, Ohta-ku (JP); Tetsuya Fujioka, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 8 days.

(21) Appl. No.: 10/133,381

(22) Filed: Apr. 29, 2002

(65) Prior Publication Data
US 2003/0039486 A1 Feb. 27, 2003

(30) Foreign Application Priority Data

Apr. 27, 2001 (JP) ........................................ 2001-132594
Apr. 27, 2001 (JP) ........................................ 2001-132597

(51) Int. Cl.⁷ .............................................. G03G 15/04
(52) U.S. Cl. ...................................... 399/211; 399/214
(58) Field of Search ................................ 399/177, 211, 399/212, 206, 209, 214

(56) References Cited

U.S. PATENT DOCUMENTS

| | | | | |
|---|---|---|---|---|
| 3,586,774 A | * | 6/1971 | Brouwer et al. ............ 358/474 |
| 5,219,154 A | | 6/1993 | Fukube et al. .............. 271/18.2 |
| 5,224,693 A | | 7/1993 | Taguchi et al. ................. 271/9 |
| 5,227,842 A | | 7/1993 | Hayashi et al. ............... 399/55 |
| 5,255,904 A | | 10/1993 | Taguchi et al. ............. 271/18.1 |
| 5,270,783 A | | 12/1993 | Bisaiji et al. ................. 399/62 |
| 5,297,376 A | | 3/1994 | Taguchi et al. ............... 53/504 |
| 5,315,322 A | | 5/1994 | Bannai ....................... 347/134 |
| 5,316,282 A | | 5/1994 | Fukube et al. ................. 271/10 |
| 5,325,213 A | | 6/1994 | Takahashi et al. .......... 358/474 |
| 5,390,033 A | | 2/1995 | Bannai et al. .............. 358/498 |
| 5,471,277 A | | 11/1995 | Fujioka et al. ................ 355/25 |
| 5,583,607 A | | 12/1996 | Fujioka et al. ................ 355/25 |
| 5,583,662 A | | 12/1996 | Takahashi et al. .......... 358/474 |
| 5,610,720 A | | 3/1997 | Fujioka et al. .............. 358/296 |
| 5,682,227 A | | 10/1997 | Taguchi et al. ................ 355/25 |
| 5,689,348 A | | 11/1997 | Takahashi et al. .......... 358/475 |
| 5,847,845 A | | 12/1998 | Takahashi et al. .......... 358/475 |
| 6,075,624 A | | 6/2000 | Bannai et al. .............. 358/498 |

FOREIGN PATENT DOCUMENTS

| | | | |
|---|---|---|---|
| JP | 5-274469 | | 10/1993 |
| JP | 6-250292 | | 9/1994 |
| JP | 09-153982 | * | 6/1997 |
| JP | 2000-174955 | | 6/2000 |
| JP | 2000-184141 | | 6/2000 |

OTHER PUBLICATIONS

U.S. Appl. No. 10/133,381, Bannai et al., filed Apr. 29, 2002.
U.S. Appl. No. 10/644,007, Bannai et al., filed Aug. 20, 2003.

* cited by examiner

Primary Examiner—Hoan Tran
(74) Attorney, Agent, or Firm—Oblon, Spivak, McClelland, Maier & Neustadt, P.C.

(57) ABSTRACT

An optical scanning device including a housing, a first carriage carrying a light source and a first mirror, a second carriage carrying second and third mirrors, the second carriage cofigured to move in a sub-scanning direction at one-half of a speed of the first carriage, first and second timing pulleys spaced apart in the sub-scanning direction, a timing belt spanned around the first and second timing pulleys to reciprocate the first carriage in the sub-scanning direction, a drive device to drive the first timing pulley, flat pulleys supported by the second carriage and spaced apart in the sub-scanning direction by a moving distance of the second carriage, a flat belt spanned around the flat pulleys to reciprocate the second carriage in the sub-scanning direction, an engaging member engaging the timing and flat belts to the first carriage, and a fixing member fixing the flat belt to the housing.

34 Claims, 14 Drawing Sheets

FIG. 8A
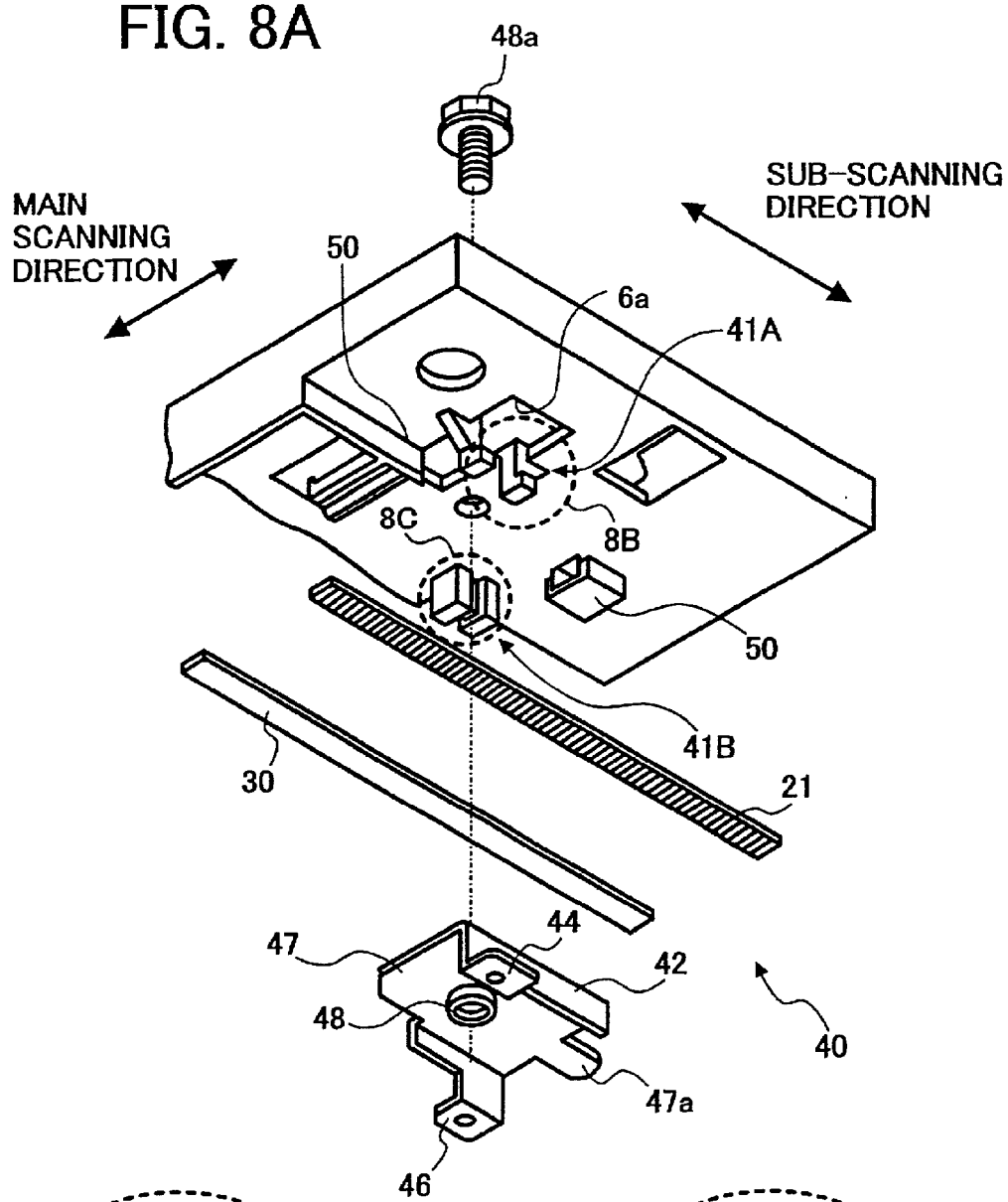
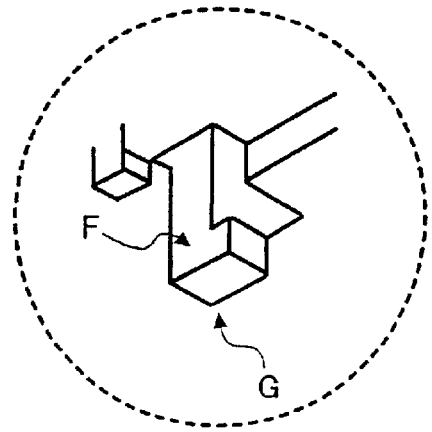
FIG. 8B
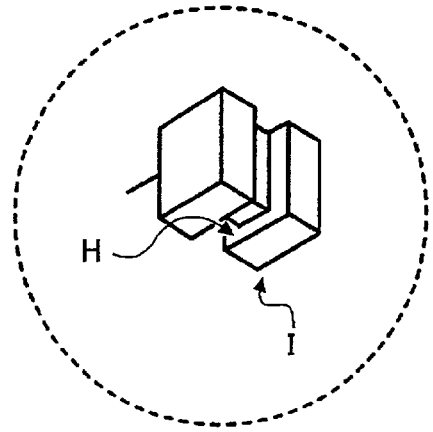
FIG. 8C

MAIN SCANNING DIRECTION

SUB-SCANNING DIRECTION

SUB-SCANNING DIRECTION

OPTICAL SCANNING DEVICE AND IMAGE FORMING APPARATUS INCLUDING THE OPTICAL SCANNING DEVICE

CROSS-REFERENCE TO RELATED APPLICATIONS

This document claims priority to Japanese Patent Application No. 2001-132597 filed in the Japanese Patent Office on Apr. 27, 2001, and Japanese Patent Application No. 2001-132594 filed in the Japanese Patent Office on Apr. 27, 2001. The entire contents of those applications are hereby incorporated herein by reference.

BACKGROUND OF THE INVENTION

1. Field of the Invention

The present invention relates to an optical scanning device and an image forming apparatus such as a copying machine, a facsimile machine, a printer, etc., including the optical scanning device.

2. Discussion of the Background

Generally, an optical scanning device of a flatbed scanner type that scans an image of an original document immovably set on a contact glass includes first and second moving carriages that move in a sub-scanning direction at a speed ratio of two to one. The first moving carriage carries a light source that irradiates an image surface of an original document with light and a first mirror that reflects the light reflected from the image surface of the original document. The second moving carriage carries at least one of a second mirror and a third mirror that reflects the light reflected from the first mirror.

The above-described optical scanning device employs a wire driving system in which the first and second moving carriages are driven via driving wires wired at both sides of the first and second moving carriages, respectively.

Alternatively, the above-described optical scanning device may employ a belt driving system in which the first and second moving carriages are individually driven via timing belts. Specifically, stepped pulleys including large-diameter pulleys and small-diameter pulleys are respectively arranged at both sides of the first and second moving carriages. Each diameter of the small-diameter pulleys is one-half that of the large-diameter pulleys.

Two pairs of endless-belt-like long and short timing belts are respectively spanned around the stepped pulleys including the large-diameter pulleys and small-diameter pulleys at both sides of the first and second moving carriages, i.e., four timing belts are provided in total. The both sides of the first moving carriage are respectively fixed to portions of the two long timing belts, and the both sides of the second moving carriage are respectively fixed to portions of the two short timing belts. With the above-described construction, the first and second moving carriages are individually driven via the long and short timing belts, respectively.

The above-described wire driving system has disadvantages as follows:

(1) The wiring of driving wires is so complicated that assembly work may not be easily accomplished. Therefore, auto-assembly of an optical system of a scanning device may be difficult to perform.

(2) In order to prevent driving wires from being tangled, a predetermined tension is necessary to be applied to the driving wires. Because of complicated wiring of the driving wires, many pulleys are required to rotatably support the driving wires. For example, at least two pulleys are required at one side of the moving carriages. Due to the tension applied to the driving wires, the force in the radial direction is exerted on each of the pulleys. In this case, a ball bearing is often used for each of the pulleys to reduce a load on the pulley, driving the cost of the device higher.

Next, an example of a background optical scanning device employing the above-described belt driving system will be described referring to FIG. 15. As illustrated in FIG. 15, long timing belts 116, 117 extending in a sub-scanning direction are respectively arranged at both sides of a first moving carriage 104 in a main scanning direction. Further, short timing belts 118, 119 extending in the sub-scanning direction are respectively arranged at both sides of a second moving carriage 105 in a main scanning direction.

The timing belt 116 is spanned around a set of timing belt pulleys 120, 121, and the timing belt 117 is spanned around another set of timing belt pulleys 122, 123. Further, the timing belt 118 is spanned around a set of timing belt pulleys 124, 125, and the timing belt 119 is spanned around a set of timing belt pulleys 126, 127. The timing belt pulleys, 120 and 124, are intercoupled each other, and the timing belt pulleys, 122 and 126, are intercoupled each other. A drive shaft 128 connects the timing belt pulleys, 120 and 124, and the timing belt pulleys, 122 and 126. One end of the drive shaft 128 is connected to a driven pulley 129. The driven pulley 129 is connected to a drive pulley 132 of a drive motor 131 via a timing belt 130.

End portions 133 of the both sides of the first moving carriage 104 in the main scanning direction are respectively attached to the timing belts, 116 and 117. Further, end portions 134 of the both sides of the second moving carriage 105 in the main scanning direction are respectively attached to the timing belts, 118 and 119, such that the second moving carriage 105 is arranged parallel to the first moving carriage 104 spaced at a predetermined distance. The end portions 133 of the first moving carriage 104 and the end portions 134 of the second moving carriage 105 are moved in the sub-scanning direction along guide rails 113.

A driving force of the drive motor 131 is applied to the timing belt pulleys, 120, 122, 124, and 126, via the drive shaft 128, thereby rotating the timing belts, 116, 117, 118, and 119, and moving the first and second moving carriages 104, 105 in the sub-scanning direction. In this optical scanning device, each diameter of the timing belt pulleys, 124 and 126, is set to be one-half that of the timing belt pulleys, 120 and 122. Thereby, the first and second moving carriages 104, 105 move at a speed ratio of 2 to 1.

The assembly work of the above-described optical scanning device employing the belt driving system may be more easily accomplished than the optical scanning device employing the wire driving system. However, in the above-described background optical scanning device employing the belt driving system, from the theoretical point of view, the first and second moving carriages 104, 105 may not move at a speed ratio of 2 to 1, because the two types of the timing belts, 116, 117, and the timing belts, 118 and 119, undergo speed variations due to engagement errors and decentering of the timing belt pulleys. In this case, the distance between a lens and an original document is minutely changed, causing deterioration of scanned images.

Further, in the above-described background optical scanning device employing the belt driving system, a predetermined tension needs to be applied to each of the timing belts, 116, 117, 118, and 119, to convey the driving force of the drive motor 131 to the first and second moving carriages 104, 105. In the above-described construction of the background optical scanning device, the drive shaft 128 is subject to the tensions of the timing belts, 116, 117, 118, and 119, so that relatively large radial forces are exerted on bearings that rotatably hold the drive shaft 128, and radial forces are also exerted on the four driven timing belt pulleys, 120, 122, 124, and 126, resulting in a high drive load condition.

Moreover, in the above-described background optical scanning device employing the belt driving system, because the first and second moving carriages 104, 105 are coupled to the drive motor 131 via the timing belts, 116, 117, 118, and 119, when the operational condition of the drive motor 131 is switched, for example, between rotation and halt, forward rotation and reverse rotation, etc., the forces in the direction of hindering the movements of the timing belts, 116, 117, 118, and 119, are typically produced due to the inertial forces of the first and second moving carriages 104, 105. As a result, the attachment positions of the first and second moving carriages 104, 105 relative to the timing belts, 116, 117, 118, and 119, may be shifted, causing deformation of scanned images in the sub-scanning direction.

If the first and second moving carriages 104, 105 are attached to the timing belts, 116, 117, 118, and 119, at a plurality positions to avoid the above-described shifts of the attachment positions, assembly work inevitably may become complicated, thereby decreasing productivity.

SUMMARY OF THE INVENTION

According to one aspect of the present invention, an optical scanning device includes a housing, a first moving carriage carrying a light source provided to irradiate an image surface of an original document with light and a first mirror provided to reflect the light reflected from the image surface of the original document, a second moving carriage carrying at least one of a second mirror and a third mirror each provided to reflect the light reflected from the first mirror, the second moving carriage being configured to move in a sub-scanning direction at about one-half of a moving speed of the first moving carriage, a plurality of timing pulleys spaced apart in the sub-scanning direction and including at least a first timing pulley and a second timing pulley, a timing belt spanned around the first and second timing pulleys to reciprocate the first moving carriage in the sub-scanning direction, a drive device configured to drive the first timing pulley to rotate, a plurality of flat pulleys rotatably supported by the second moving carriage and spaced apart in the sub-scanning direction by a distance corresponding to a moving amount of the second moving carriage, a flat belt spanned around the plurality of flat pulleys to reciprocate the second moving carriage in the sub-scanning direction, an engaging member detachably engaging the timing belt and the flat belt to the first moving carriage, and a fixing member fixing the flat belt to the housing at a position different from a position where the flat belt is engaged to the first moving carriage by substantially half of a circumference of the flat belt. The plurality of timing pulleys, timing belt, plurality of flat pulleys, flat belt, engaging member, and fixing member are provided at each side of the first and second moving carriages in the main scanning direction.

According to another aspect of the present invention, an optical scanning device includes a moving carriage carrying an exposure optical system, a timing belt positioned along a sub-scanning direction to reciprocate the moving carriage in the sub-scanning direction, and a belt clamp mechanism detachably clamping the timing belt to the moving carriage, the belt clamp mechanism including, a plurality of comb-tooth members provided to a lower surface of the moving carriage spaced apart in the sub-scanning direction by a gap such that the plurality of comb-tooth members protrude from the lower surface of the moving carriage toward the timing belt, and a clamp member having a support surface having a protrusion protruding toward the gap between the plurality of comb-tooth members. The clamp member is secured to the moving carriage such that the clamp member opposes the plurality of comb-tooth members via the timing belt while the protrusion on the support surface pressing the timing belt into the gap between the pair of comb-tooth members.

Objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 8A is an exploded view of a belt clamp mechanism according to the embodiment of the present invention;

FIG. 8B is a schematic enlarged view of comb-tooth-like members;

FIG. 8C is a schematic enlarged view of another comb-tooth-like members;

DESCRIPTION OF THE PREFERRED EMBODIMENTS

Figure 1:
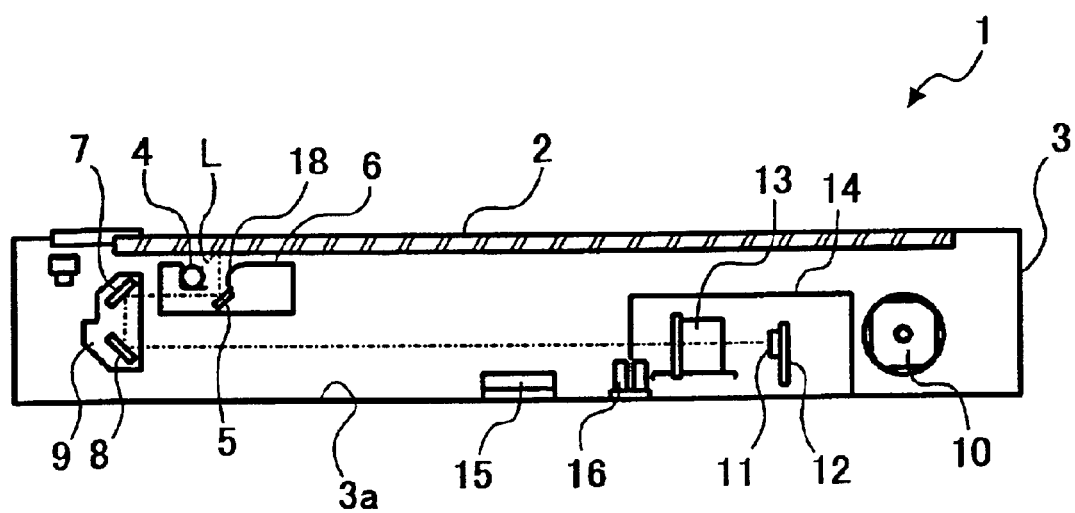
FIG. 1 is a schematic vertical longitudinal sectional side view of an optical scanning device according to an embodiment of the present invention.

Preferred embodiments of the present invention are described in detail referring to the drawings, wherein like reference numerals designate identical or corresponding parts throughout the several views.

An optical scanning device according to an embodiment of the present invention is a flatbed scanner type that scans an original document immovably set on a contact glass. First, an overall construction of the optical scanning device will be described referring to FIG. 1. FIG. 1 is a schematic vertical longitudinal sectional side view of an optical scanning device 1 according to this embodiment of the present invention. The optical scanning device 1 includes a case-like housing 3 having a contact glass 2 at the upper surface of the housing 3 for setting original documents on the contact glass 2.

In the housing 3, there are provided a first moving carriage 6 and a second moving carriage 9. The first moving carriage 6 carries a xenon lamp 4 (hereinafter referred to as a "Xe lamp") serving as a light source which irradiates an image surface of an original document set on the contacts glass 2 with a light (L), and a first mirror 5 inclined at about 45 degrees to reflect the light (L) reflected from the image surface of the original document. The Xe lamp 4 and the first mirror 5 constitute an exposure optical system. The second moving carriage 9 carries a second mirror 7 and a third mirror 8 respectively inclined at about 45 degrees to reflect the light (L) reflected from the first mirror 5. In the housing 3, the light (L) reflected from the third mirror 8 is imaged on a charge-coupled device 11 (hereinafter referred to as a "CCD 11") serving as an image reading device through a lens block 13. The CCD 11 is mounted on a sensor board unit 12, and the lens block 13 is mounted on a lens block stay 14. As an alternative example, the second moving carriage 9 may carry at least one of the second mirror 7 and the third mirror 8.

The first moving carriage 6 and the second moving carriage 9 are arranged such that each longitudinal direction of the first moving carriage 6 and the second moving carriage 9 corresponds to a main scanning direction, i.e., in a direction perpendicular to the sheet in FIG. 1. The first moving carriage 6 and the second moving carriage 9 reciprocate in a sub-scanning direction, i.e., in a right-and-left direction in FIG. 1, at a speed ratio of two to one. The first moving carriage 6 and the second moving carriage 9 during standby are located at their respective home positions at the left-hand side of the housing 3 in FIG. 1.

The Xe lamp 4 has a slit-like aperture along its axial direction at the position in which the Xe lamp 4 faces the contact glass 2. Further, a light reflecting film is attached to the Xe lamp 4 to cover the portions of the Xe lamp 4 other than the slit-like aperture. By use of the light reflecting film, the light (L) is efficiently emitted from the Xe lamp 4 toward an original document set on the contact glass 2.

In the housing 3, there are further provided a drive motor 10 including a stepping motor and serving as a drive device that drives the first moving carriage 6 and the second moving carriage 9 to reciprocate in the sub-scanning direction, and a sheet width sensor 15 and a sheet length sensor 16 that detect a size of an original document set on the contact glass 2.

Figure 2:
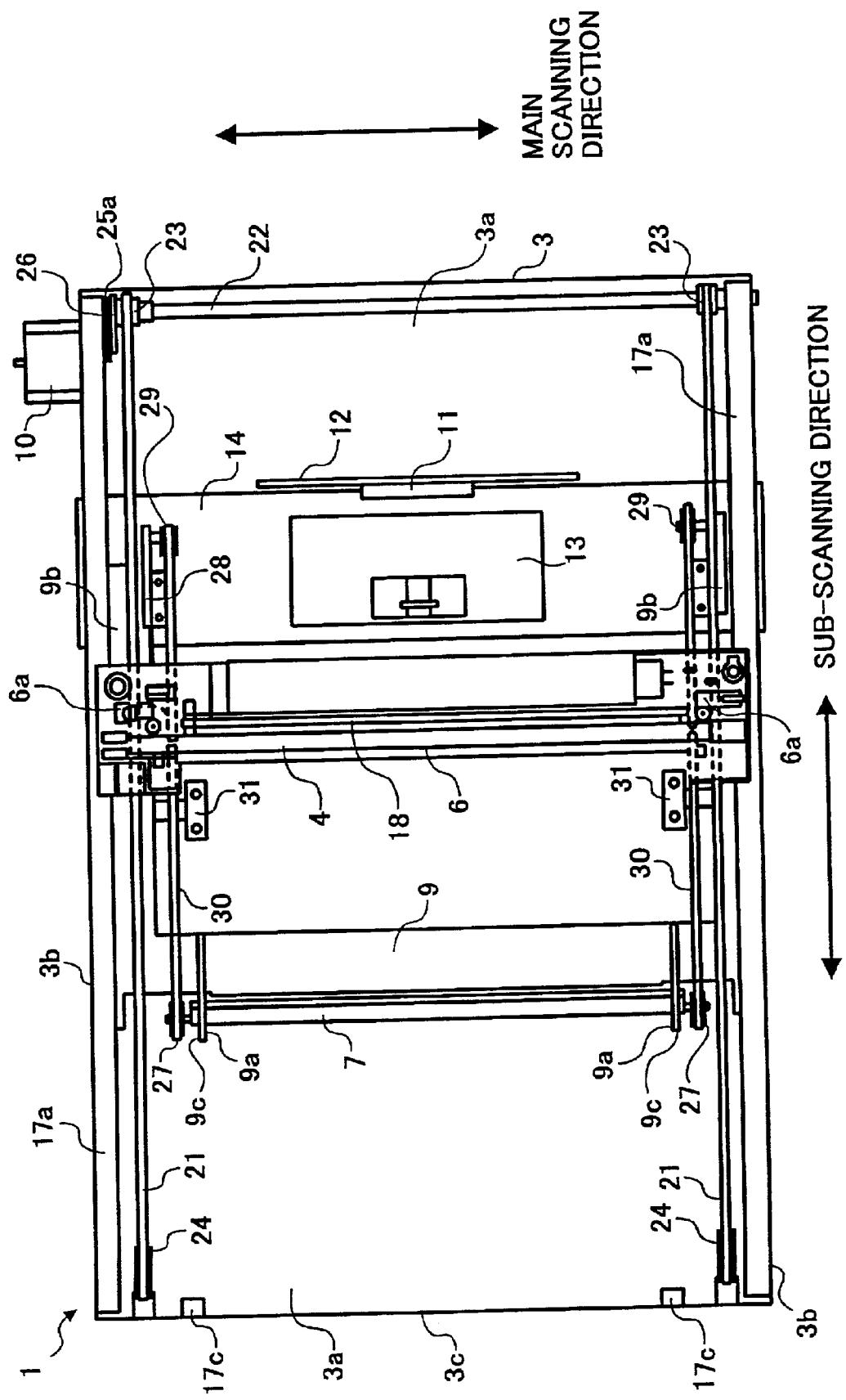
FIG. 2 is a horizontal sectional view of the optical scanning device illustrating an inside construction thereof.
Figure 3:
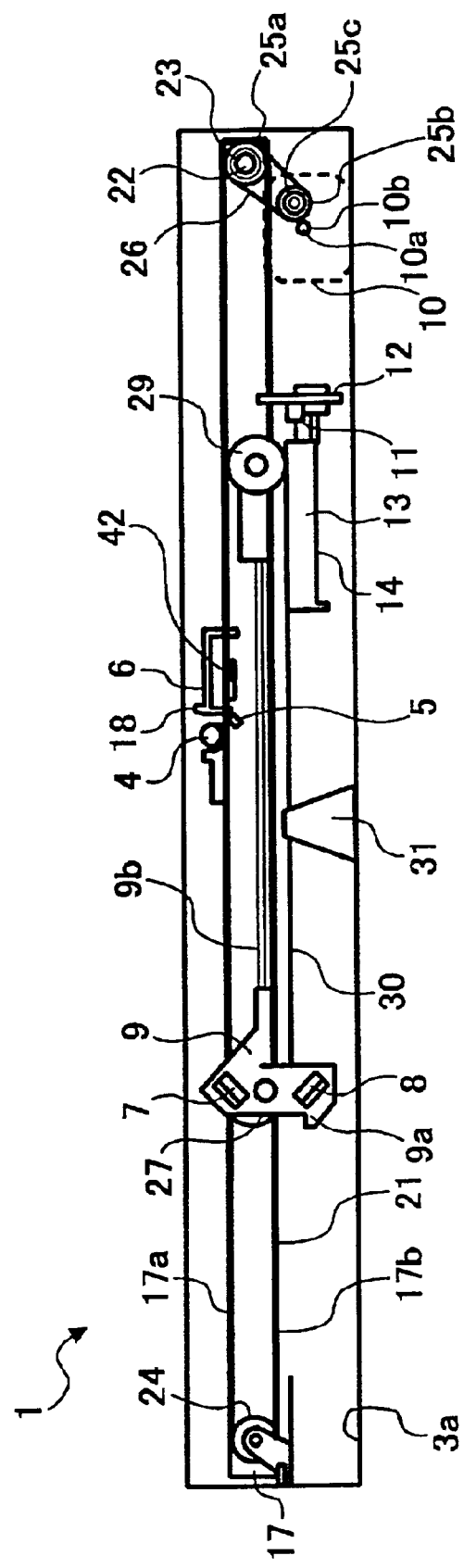
FIG. 3 is a vertical longitudinal sectional side view of the optical scanning device of FIG. 2.
Figure 4:
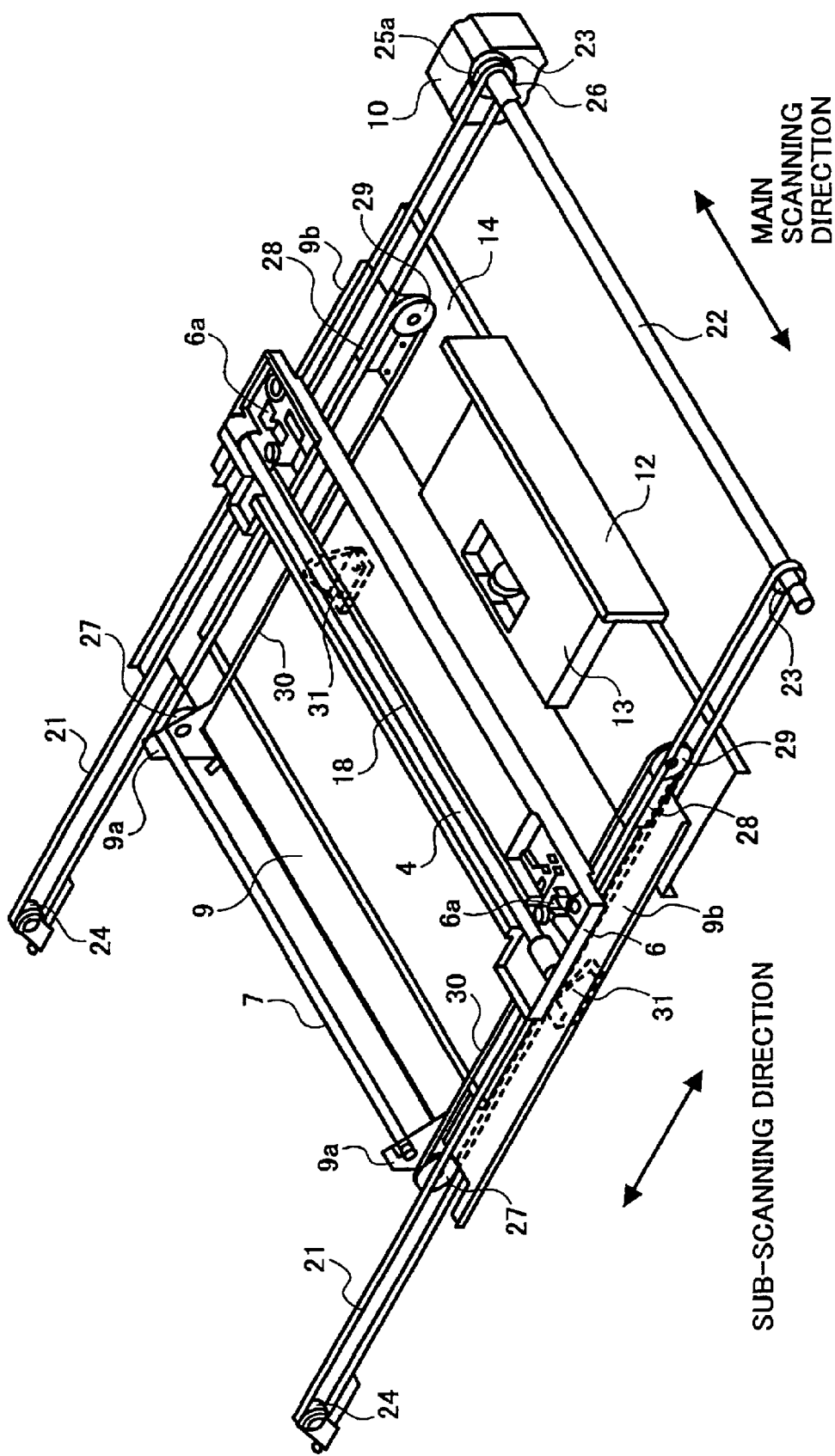
FIG. 4 is a perspective view of elements of the optical scanning device provided in a housing of the optical scanning device.
Figure 5:
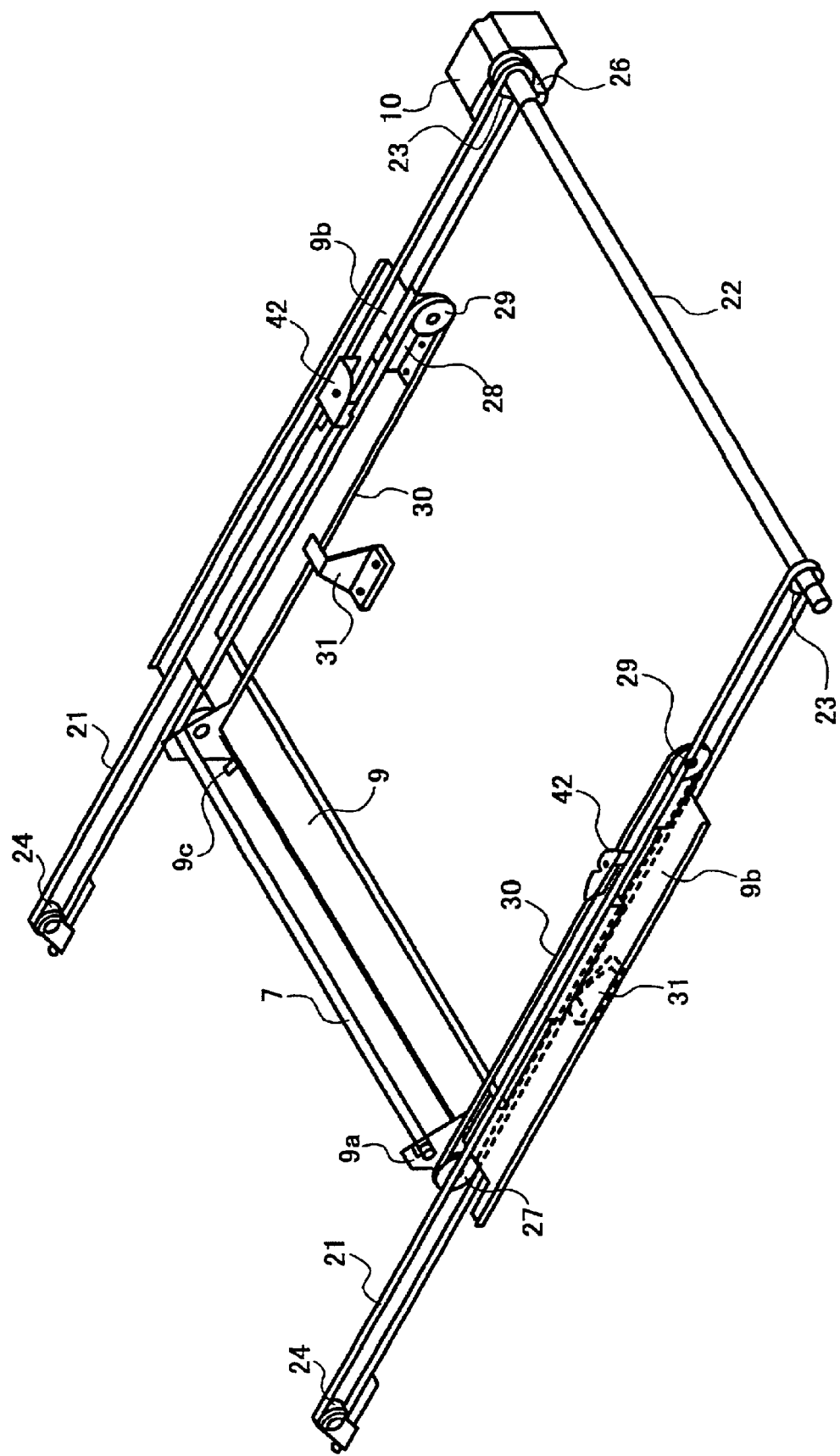
FIG. 5 is a perspective view of a part of the elements of the optical scanning device of FIG. 4.

Next, a description will be made to elements of the optical scanning device 1 referring to FIGS. 2 through 5. FIG. 2 is a horizontal sectional view of the optical scanning device 1 illustrating an inside construction thereof. FIG. 3 is a vertical longitudinal sectional side view of the optical scanning device 1 of FIG. 2. FIG. 4 is a perspective view of elements of the optical scanning device 1 provided in the housing 3. FIG. 5 is a perspective view of a part of the elements of the optical scanning device 1 of FIG. 4. The optical scanning device 1 according to the present embodiment scans images on sheets of various sizes including an A3 size. Due to limitations of space, the optical scanning device 1 is illustrated in figures in a more elongate rectangular shape than an actual shape by reducing the size of the optical scanning device 1 in the main scanning direction.

The housing 3 is one piece of a sheet metal member in a substantially cross shape including a rectangular shaped bottom plate (3a) and wall plates standing on all sides of the bottom plate (3a). By forming the housing 3 from one piece of a sheet metal member, the size of the housing 3 is obtained with accuracy, and a number of construction parts and assembly processes is reduced.

Referring to FIGS. 2 and 3, the housing 3 includes a pair of side walls (3b) standing on the sides of the bottom plate (3a) along the sub-scanning direction. Substantially U-shaped rail members are respectively provided to the side walls (3b). Specifically, the optical scanning device 1 includes a two-step rail structure including a pair of rails (17a) and a pair of rails (17b) extending along the sub-scanning direction at the inner sides of the housing 3. Hereinafter, a pair of rails for the first moving carriage 6 arranged at upper steps will be referred to as first rails (17a), and a pair of rails for the second moving carriage 9 arranged at lower steps will be referred to as second rails (17b). By providing the sliding surfaces of the first moving carriage 6 and the second moving carriage 9 independently as the first rails (17a) and the second rails (17b), respectively, the first moving carriage 6 and the second moving carriage 9 can be closer to each other at the home positions, thereby allowing the optical scanning device 1 to be compact in size.

The housing 3 further includes a wall (3c) standing on the side of the bottom plate (3a) along the main scanning direction at the side of the home positions of the first moving carriage 6 and the second moving carriage 9. A stopper (17c) that regulates the movement of the second moving carriage 9 located at its home position in a substantially vertical direction is integrally formed with the wall (3c). The stopper (17c) is formed by cutting a part of the wall (3c) and being raised from the plane of the wall (3c). The stopper (17c) is formed at a position corresponding to an arm portion (9c) in L shape formed with a mirror stay (9a) (details of which will be described later) of the second moving carriage 9.

The first moving carriage 6 includes four sliders (not shown) at the four corners of the lower surface of the first moving carriage 6. The first moving carriage 6 reciprocates in the sub-scanning direction by bringing the four sliders into contact with the upper surfaces of the pair of first rails (17a).

The first moving carriage 6 further includes a reflector 18 such that the longitudinal direction of the reflector 18 corresponds to the axial direction of the Xe lamp 4. The reflector 18 includes a reflection surface inclined at about 45 degrees to oppose both the Xe lamp 4 and the contact glass 2. A sheet-like light reflective film (not shown) is attached to the reflection surface of the reflector 18 to reflect the light emitted from the Xe lamp 4 toward the contact glass 2.

At the both sides of the bottom surface of the first moving carriage 6 in the main scanning direction, there are provided through holes (6a) penetrating the bottom surface of the first moving carriage 6 in the substantially vertical direction. The through holes (6a) are used for visually checking positions where the timing belts 21 are engaged to the first moving carriage 6 by use of a clamp member 42 (details of which will be described later).

At both end portions of the lower surface of the first moving carriage 6 in the main scanning direction, endless-belts serving as timing belts 21 extend in the sub-scanning direction across the housing 3.

One end side of each of the timing belts 21 is wound around a drive timing pulley 23. The drive timing pulleys 23 are respectively fixed at both end portions of a drive shaft 22 extending in the main scanning direction. The other end sides of the timing belts 21 are wound around driven timing pulleys 24, respectively, provided to the housing 3. Each of the driven timing pulleys 24 is biased in a direction away from the drive timing pulley 23 by an extension spring (not shown) spanned between the driven timing pulley 24 and the housing 3. Thereby, tension is applied to each of the timing belts 21 in the sub-scanning direction.

A drive transmission timing pulley (25a) is provided at one end of the drive shaft 22. The drive motor 10, which drives the first moving carriage 6 and the second moving carriage 9 to reciprocate in the sub-scanning direction, is arranged at a side of the drive transmission timing pulley (25a). As schematically illustrated in FIG. 3, a helical gear (10b) is fixed on a drive shaft (10a) of the drive motor 10, rotates and is engaging with a reduction gear (25b). A transmission timing pulley (25c) is coaxially provided with the reduction gear (25b). An endless-belt serving as a drive timing belt 26 is spanned around the transmission timing pulley (25c) and the drive transmission timing pulley (25a). With this construction, the drive force of the drive motor 10 is conveyed to the drive timing pulleys 23 via the drive shaft 22.

In order to stabilize the rotation of the drive motor 10, a disk made of iron (not shown) is fixed to the drive shaft 10a at the rear side of the drive motor 10. At the side of the helical gear (10b), a rubber damper (not shown) is provided between the drive motor 10 and a motor bracket (not shown) to prevent vibrations. The motor bracket is slidable so as to adjust the tension of the drive timing belt 26. After a predetermined tension is applied to the motor bracket by a spring, the motor bracket is screwed.

The second moving carriage 9 includes a pair of mirror stays (9a) that support the second mirror 7 and the third mirror 8 at their ends in the main scanning direction, and arms (9b) extending from the mirror stays (9a) toward their outer sides and the first moving carriage 6. The length of the arms (9b) corresponds to a moving amount of the second moving carriage 9 in the sub-scanning direction. Accordingly, the second moving carriage 9 according to this embodiment of the present invention is in a substantially U-shape in a horizontal plane.

On the outer sides of the mirror stays (9a), flat pulleys 27 are rotatably provided, respectively. Further, brackets 28 are respectively provided to the tip end portions of the arms (9b). Flat pulleys 29 are rotatably held by the brackets 28, respectively, such that the flat pulleys 29 are in the plane of the flat pulleys 27. The flat pulley 27 and the flat pulley 29 are used in a pair. Further, endless-belts serving as flat belts 30 are spanned around the flat pulleys 27 and the flat pulleys 29, respectively. The pair of flat belts 30 rotate along the sub-scanning direction at the both end portions of the second moving carriage 9 in the main scanning direction. The flat pulleys 27 and the flat pulleys 29 are arranged so that the flat belts 30 extend in parallel with the timing belts 21 spaced apart.

The brackets 28 holding the flat pulleys 29 are slidable relative to the arms (9b), and are provided with a predetermined tension applied thereto by springs (not shown).

With regard to the flat belts 30, tension need not be applied to each of the flat belts 30 so long as the flat belts 30 do not sag between the flat pulleys 27 and the flat pulleys 29, because the flat belts 30 do not need to convey the drive force of the drive motor 10 as compared to the timing belts 21. However, in order to avoid sag in the flat belts 30 at the time of assembling, a slight tension of about several hundred grams may be applied to the flat belts 30. In this condition, the tension applied to the flat belts 30 is so slight that rotation loads between the flat pulleys 27, 29 and shafts supporting the flat pulleys 27, 29 are very small. Therefore, the flat pulleys 27, 29 do not require ball bearings for reducing the above-described rotation loads.

Further, four sliders (not shown) are provided at the four corners of the lower surface of the second moving carriage 9 corresponding to diagonally opposing positions of the overall configuration of the second moving carriage 9. The second moving carriage 9 reciprocates along the sub-scanning direction by bringing the four sliders into contact with the upper surfaces of the pair of second rails (17b).

The second moving carriage 9 is arranged such that the arms (9b) are positioned inside of respective loops of the timing belts 21. Further, the pair of flat belts 30 are positioned at inner sides of the pair of timing belts 21 in the main scanning direction in the housing 3.

Figure 6:
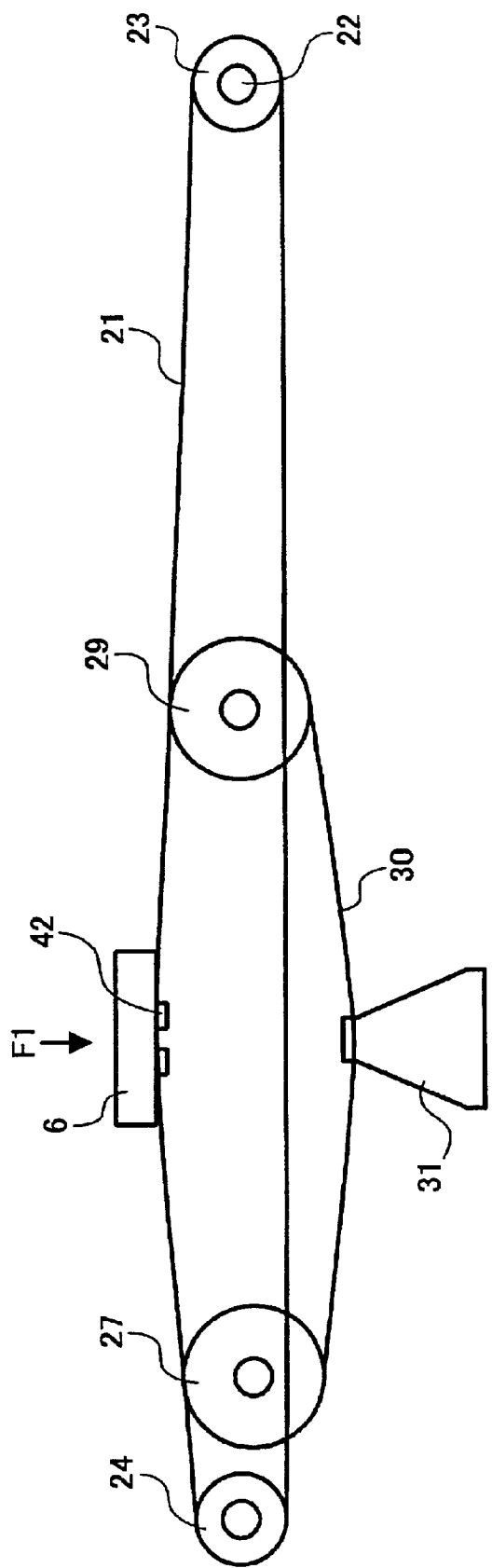
FIG. 6 is a schematic view for explaining a state in which a timing belt and a flat belt are engaged to a first moving carriage by a clamp member, and the flat belt is fixed by a fixing member.

As schematically illustrated in FIG. 6, the timing belts 21 and the flat belts 30 are engaged to the lower surface of the first moving carriage 6 at the both end side portions of the first moving carriage 6 by the clamp member 42 (details of which will be described later). The timing belts 21 and the flat belts 30 are engaged to the first moving carriage 6 in locations at a substantially equal height where the flat belts 30 are engaged to the first moving carriage 6.

When engaging each of the timing belts 21 and flat belts 30 to the lower surface of the first moving carriage 6 by the clamp member 42 in the same plane at the same time, as schematically illustrated in FIG. 6, the first moving carriage 6 engages the timing belts 21 and the flat belts 30 while slightly lifting the timing belts 21 and the flat belts 30 so that a downward force indicated by Arrow (F1) is produced in the first moving carriage 6 by the tensions of the timing belts 21 and the flat belts 30. Thereby, the first moving carriage 6 is pressed against the first rails (17a), and the sliders provided at the four corners of the lower surface of the first moving carriage 6 securely contact the first rails (17a). As a result, the first moving carriage 6 stably scans an image of an original document, and jitter and deformation of a scanned image are effectively prevented. Therefore, a high-quality scanned image is obtained in the optical scanning device 1. Further, in the above-described optical scanning device 1, although the first moving carriage 6 pulls the second moving carriage 9 in the sub-scanning direction via the flat belts 30, a rotation torque is not produced on the first moving carriage 6 when moving, because the timing belts 21 and the flat belts 30 are engaged to the first moving carriage 6 in the same plane. Thereby, the first moving carriage 6 stably moves in the sub-scanning direction, and a quality of a scanned image is enhanced.

Further, as illustrated in FIGS. 2 through 6, portions of the flat belts 30 are fixed relatively to the bottom plate (3a) of the housing 3 by engaging the portions of the flat belts 30 to fixing members 31 fixed on the bottom plate (3a) of the housing 3. The portions of the flat belts 30 which are fixed relatively to the bottom plate (3a) by the fixing members 31 are separated from the portions of the flat belts 30 which are engaged to the first moving carriage 6 by the clamp members 42 by substantially half of the circumference of the flat belt 30. Because a portion of each of the flat belts 30 is thus fixed by the fixing member 31, even if the flat belt 30 is moved following the timing belt 21 at the position where the flat belt 30 is engaged to the first moving carriage 6 by the clamp member 42, the flat belt 30 does not rotate by itself but moves in the sub-scanning direction together with the flat pulleys 27, 29 on the principle of pulley. Accordingly, the flat pulleys 27, 29, and the second moving carriage 9 holding the flat belt 30 also move in the sub-scanning direction.

Referring to FIG. 6, as described above, each upper portion of the flat belts 30 is engaged to the first moving carriage 6 in a slightly lifted condition, so that a force of lifting the second moving carriage 9 by the first moving carriage 6 is exerted on the second moving carriage 9. On the other hand, each lower portion of the flat belts 30 is fixed relatively to the bottom plate (3a) by the fixing member 31 at a relatively lower position, so that a force of pulling down the second moving carriage 9 by the fixing member 31 is exerted on the second moving carriage 9.

According to the present embodiment, the above-described force of lifting the second moving carriage 9 by the first moving carriage 6 is made substantially equal to the force of pulling down the second moving carriage 9 by the fixing member 31, thereby allowing the second moving carriage 9 to move while securely contacting the second rails (17b). In the optical scanning device 1 thus constructed, the force of biasing the second moving carriage 9 downward is produced, and thereby the second moving carriage 9 stably reciprocates while securely bringing the sliders provided at the lower surface of the second moving carriage 9 into contact with the second rails (17b). As a result, the deformation of a scanned image is effectively prevented, and a high-quality scanned image is obtained.

The second moving carriage 9 is formed from a unit constructed by integrally assembling the arms (9b), the flat pulleys 27, the flat pulleys 29, the flat belts 30, etc. When assembling the optical scanning device 1, the end portions of the second moving carriage 9 in the main scanning direction are put into inside of the loops of the timing belts 21 and positioned on the second rails (17b). Subsequently, while positioning the first moving carriage 6 and the second moving carriage 9 at predetermined positions, the timing belts 21 and the flat belts 30 are engaged to the first moving carriage 6 by the clamp members 42, and the flat belts 30 are fixed to the bottom plate (3a) of the housing 3 by the fixing members 31. Thus, the assembling work for the optical scanning device 1 can be simplified. Especially, the assembling work is facilitated by positioning the flat belts 30 at inner sides of the timing belts 21 in the main scanning direction.

In the above-described optical scanning device 1 thus constructed, when scanning an image on an original document, the drive motor 10 drives to reciprocate the first moving carriage 6 and the second moving carriage 9 at a speed ratio of 2 to 1, and the Xe lamp 4 lights up. As illustrated in FIG. 1, the light (L) emitted from the Xe lamp 4 is reflected by the image surface of the original document through the contact glass 2 and reaches the first mirror 5. Subsequently, the light (L) is sequentially reflected by the second mirror 7 and the third mirror 8, and is then converged to the CCD 11 through the lens block 13. Thus, the image on the original document is scanned and read.

Figure 7A:
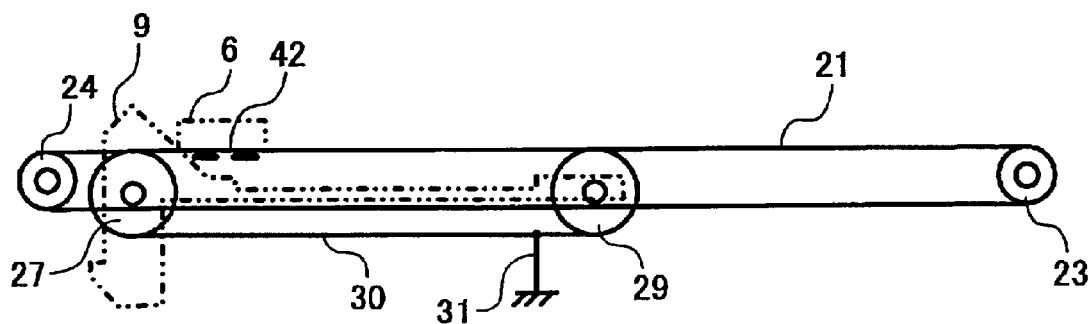
FIGS. 7A and 7B are schematic views for explaining moving operations of the first moving carriage and a second moving carriage on the principle of pulley.
Figure 7B:
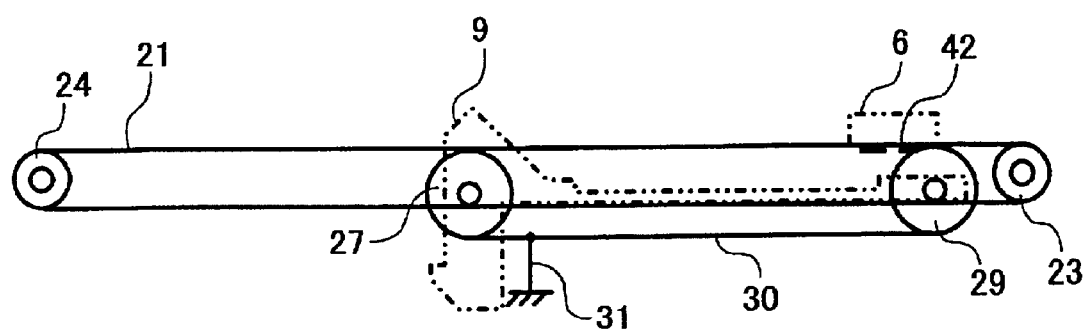

Next, a brief description will be made to the reciprocating motions of the first moving carriage 6 and the second moving carriage 9. As described above, the timing belts 21 and the flat belts 30 are engaged to the first moving carriage 6. Therefore, with the reciprocating motions of the first moving carriage 6 caused by the rotational movements of the timing belts 21, the positions where the flat belts 30 are engaged to the first moving carriage 6 are shifted by the same moving amount in the same moving direction as that of the first moving carriage 6. However, as the lower portions of the flat belts 30 are fixed to the bottom plate 3a of the housing 3 by the fixing members 31, as schematically illustrated in FIGS. 7A and 7B, the second moving carriage 9 moves by one-half of the moving amount and at one-half of the moving speed of the first moving carriage 6 in the same moving direction as the first moving carriage 6 on the principle of pulley.

As described above, the second moving carriage 9 is not driven by a drive device such as the drive motor 10 and the drive shaft 22 but is pulled by the timing belts 21 for the first moving carriage 6, so that the second moving carriage 9 is moved following the first moving carriage 6 at one-half of the moving speed of the first moving carriage 6. With this construction of the first moving carriage 6 and the second moving carriage 9, the positional relation between the first moving carriage 6 and the second moving carriage 9 is accurately kept at the time of reciprocating motions of the first moving carriage 6 and the second moving carriage 9, thereby preventing the deformation of a scanned image on an original document in the sub-scanning direction.

The optical scanning device 1 according to the present embodiment employs a dual side driving system in which the elements such as the timing belts 21 and the flat belts 30 are respectively arranged at both sides of the first moving carriage 6 and the second moving carriage 9 in the main scanning direction. Owing to the dual side driving system, the first moving carriage 6 and the second moving carriage 9 can stably move, thereby enhancing the quality of the scanned image.

Figure 9:
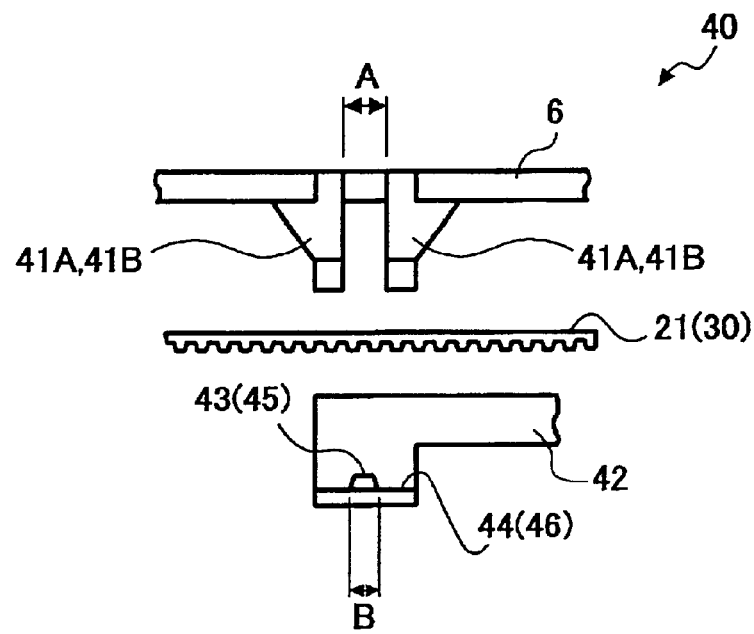
FIG. 9 is a side view of the belt clamp mechanism of FIG. 8.

Next, a belt clamp mechanism 40 including the clamp members 42 will be described referring to FIGS. 8 through 13. FIG. 8 is an exploded view of the belt clamp mechanism 40. FIG. 9 is a side view of the belt clamp mechanism 40 of FIG. 8.

Figure 11A:
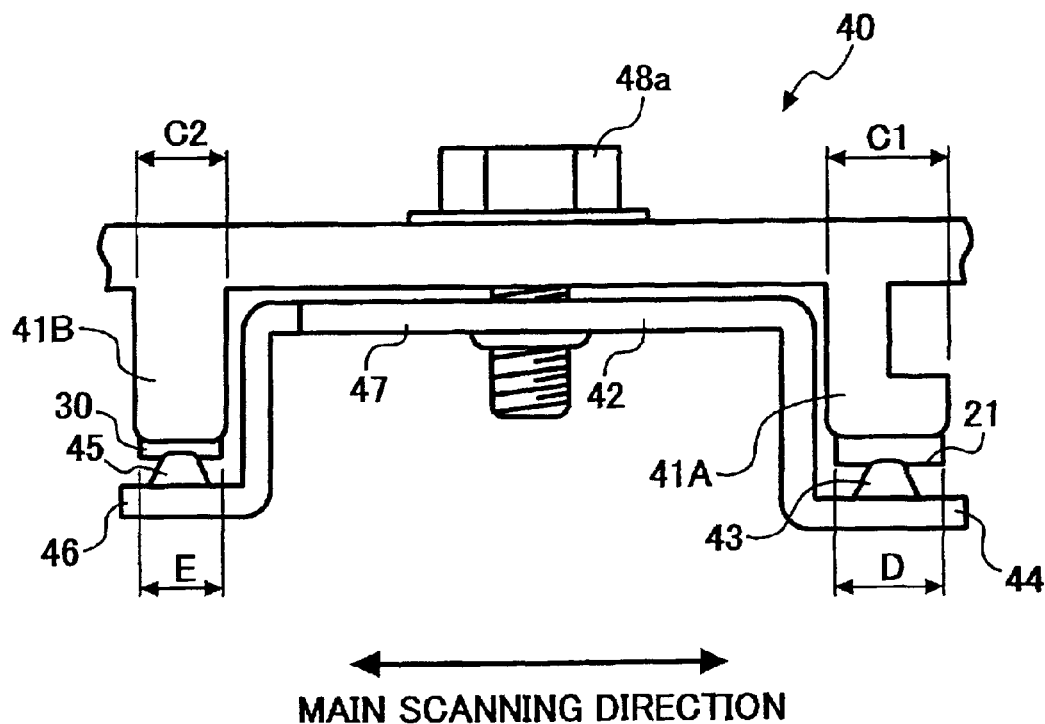
FIG. 11A is a cross sectional side view of the belt clamp mechanism taken along a main scanning direction.

As illustrated in FIG. 8, comb-tooth-like members (41A, 41B) are provided to the lower surface of the first moving carriage 6 such that the comb-tooth-like members (41A, 41B) protrude from the lower surface toward the timing belt 21 and the flat belt 30, respectively. Specifically, a pair of the comb-tooth-like members (41A) are arranged along the sub-scanning direction spaced apart each other by a predetermined gap, and a pair of the comb-tooth-like members (41B) are arranged along the sub-scanning direction spaced apart each other by a predetermined gap. As illustrated in FIG. 11A, the length (C1) of the comb-tooth-like members (41A) in the main scanning direction is set to be longer than a width (D) of the timing belt 21 facing the comb-tooth-like members (41A). Further, the length (C2) of the comb-tooth-like members (41B) in the main scanning direction is set to be longer than a width (E) of the flat belt 30 facing the comb-tooth-like members (41B).

Figure 10:
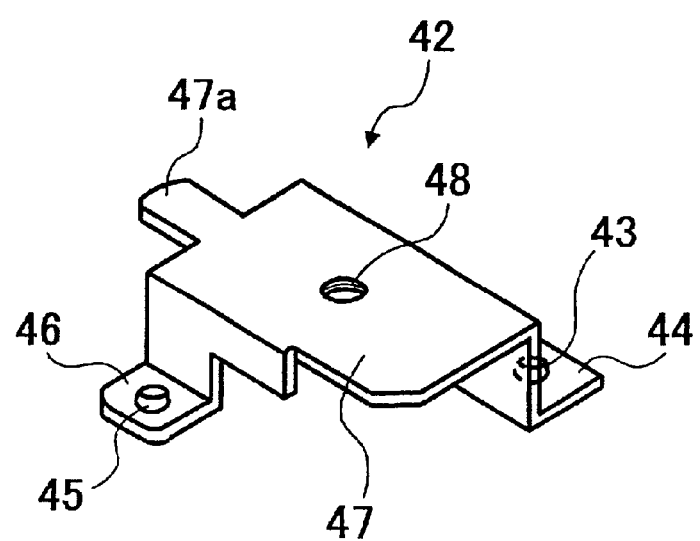
FIG. 10 is a perspective view of a clamp member.
Figure 11B:
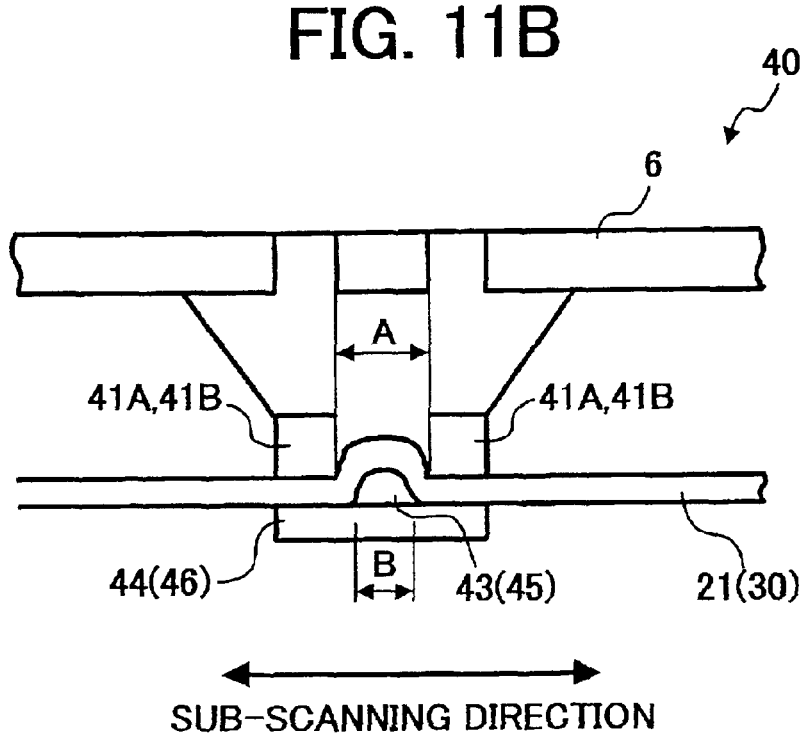
FIG. 11B is a cross sectional side view of the belt clamp mechanism taken along a sub-scanning direction.

The clamp member 42 is secured to the lower surface of the first moving carriage 6. FIG. 10 is a perspective view of the clamp member 42. The clamp member 42 includes a first support surface 44 formed with a first protrusion 43 that protrudes toward the gap between the comb-tooth-like members (41A) to which the first protrusion 43 is opposite via the timing belt 21, and a second support surface 46 formed with a second protrusion 45 that protrudes toward the gap between the comb-tooth-like members (41B) to which the second protrusion 45 is opposite via the flat belt 30. The clamp member 42 further includes a flat plate member 47 with which the first support surface 44 and the second support surface 46 are provided in a diagonal relation. As illustrated in FIG. 11B, each diameter length of the first protrusion 43 and the second protrusion 45 indicated by a reference character, B, in FIG. 11B is set to be smaller than gaps (A) between the paired comb-tooth-like members (41A) and between the paired comb-tooth-like members (41B).

A screw hole 48 is formed at a substantially central part of the flat plate member 47 between the first support surface 44 and the second support surface 46 to secure the clamp member 42 to the first moving carriage 6 by a screw (48a).

The first support surface 44 and the second support surface 46 are provided with the flat plate member 47 such that the first support surface 44 and the second support surface 46 respectively oppose the bottom surfaces of the comb-tooth-like members (41A, 41B) when the flat plate member 47 of the clamp member 42 is secured to the first moving carriage 6 by the screw (48a).

The flat plate member 47 includes a protrusion part (47a) that is protruding in the plane of the flat plate member 47 from an end face of the flat plate member 47 which is not connecting to the first support surface 44 or the second support surface 46.

FIG. 11A is a cross sectional side view of the belt clamp mechanism 40 taken along the main scanning direction. FIG. 11B is a cross sectional side view of the belt clamp mechanism 40 taken along the sub-scanning direction.

Referring to FIG. 11A, the clamp member 42 is secured to the first moving carriage 6 by engaging the screw (48a) with the screw hole 48 formed at the substantially central part of the flat plate member 47 between the first support surface 44 and the second support surface 46. By securing the clamp member 42 to the first moving carriage 6 by the screw (48a), the force of clamping the timing belt 21 against the comb-tooth-like members (41A) by the first support surface 44 is made equal to the force of clamping the flat belt 30 against the comb-tooth-like members (41B) by the second support surface 46.

Referring further to FIGS. 11A and 11B, as described above, the length (C1) of the comb-tooth-like members (41A) in the main scanning direction is set to be longer than the width (D) of the timing belt 21 facing the comb-tooth-like members (41A). Further, the length (C2) of the comb-tooth-like members (41B) in the main scanning direction is set to be longer than the width (E) of the flat belt 30 facing the comb-tooth-like members (41B).

By these settings, the timing belt 21 is pinched between the comb-tooth-like members (41A) and the first support surface 44, and the flat belt 30 is pinched between the comb-tooth-like members (41B) and the second support surface 46. In doing so, the comb-tooth-like members (41A, 41B) press the timing belt 21 and the flat belt 30 against the first and second support surfaces 44, 46 over the whole areas of the timing belt 21 and the flat belt 30 in the main scanning direction, respectively. Thereby, the slippage of the timing belt 21 between the pair of comb-tooth-like members (41A) is effectively prevented. Similarly, the slippage of the flat belt 30 between the pair of comb-tooth-like members (41B) is effectively prevented.

Figure 12A:
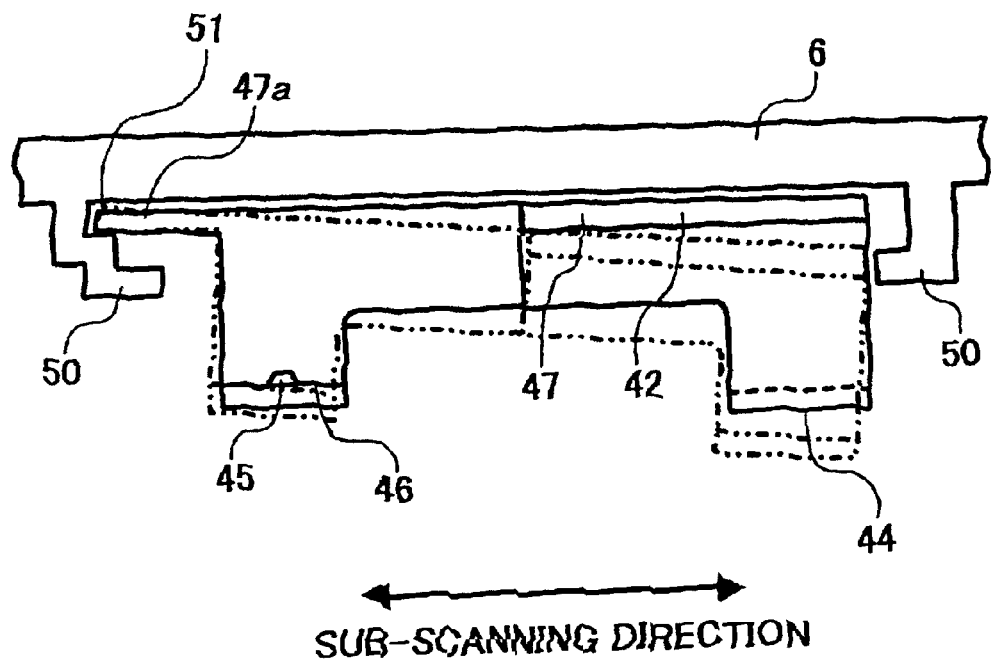
FIGS. 12A and 12B are schematic side views of the first moving carriage and the clamp member for explaining an attachment work of the clamp member to the first moving carriage.
Figure 12B:
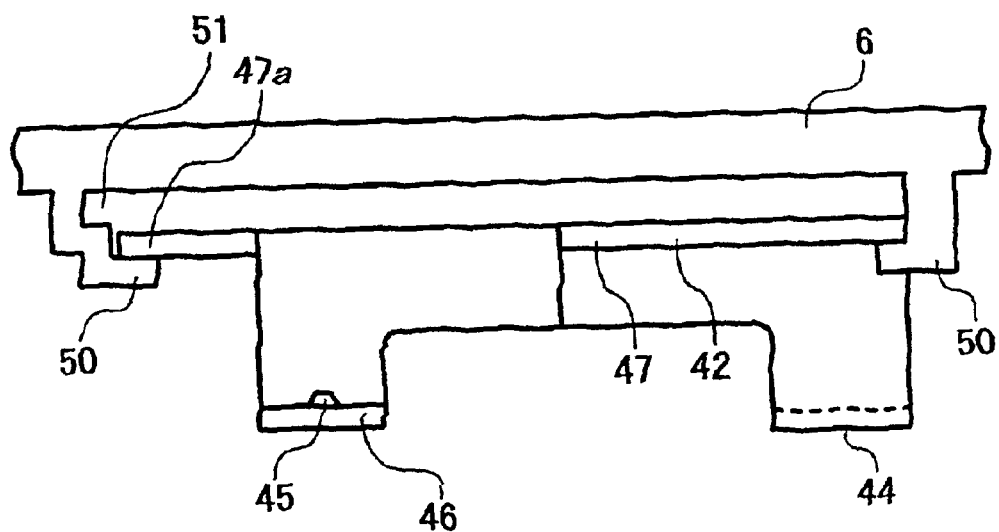

Referring to FIGS. 8A, 12A and 12B, a pair of clamp member holding members 50 are provided on the lower surface of the first moving carriage 6 such that the pair of clamp member holding members 50 protrude from the lower surface of the first moving carriage 6 spaced apart from each other in the sub-scanning direction by a distance substantially equal to a length of the clamp member 42 in the sub-scanning direction. The tip ends of the clamp member holding members 50 are bent inwardly such that the tip ends of the clamp member holding members 50 oppose each other spaced apart by a distance smaller than the length of the clamp member 42 in the sub-scanning direction. One of the clamp member holding members 50 includes a concave portion 51 dented in the direction away from the opposite clamp member holding member 50. The length between the concave portion 51 and the tip end of the other clamp member holding member 50 is set to be longer than a length of the clamp member 42 including the protrusion part (47a) in the sub-scanning direction.

Next, the attachment work of the clamp member 42 to the first moving carriage 6 will be described. When attaching the clamp member 42 to the first moving carriage 6, as illustrated in FIG. 12A, the protrusion part (47a) of the clamp member 42 is inserted into the concave portion 51 of the clamp member holding member 50. Because the length between the concave portion 51 and the tip end of the other clamp member holding member 50 is set to be longer than the length of the clamp member 42 including the protrusion part (47a) in the sub-scanning direction, by inserting the protrusion part (47a) into the concave portion 51, the clamp member 42 is situated between the clamp member holding members 50 as illustrated in FIG. 12B.

As described above, the tip ends of the clamp member holding members 50 oppose each other apart by the distance smaller than the length of the clamp member 42 in the sub-scanning direction. Therefore, the clamp member 42 situated between the clamp member holding members 50 does not fall depending on the orientation of the first moving carriage 6. As a result, before securing the clamp member 42 to the first moving carriage 6 by the screw (48a), the clamp member 42 temporarily positioned on the lower surface of the first moving carriage 6 is stably held by the clamp member holding members 50 without dropping.

Next, a description will be made to attachment works of the timing belt 21 and the flat belt 30 by the belt clamp mechanism 40. Under the condition in which the clamp member 42 is held at the lower surface of the first moving carriage 6 by the clamp member holding members 50, the timing belt 21 and the flat belt 30 are respectively positioned between the first moving carriage 6 and the first and second protrusions 43, 45.

As described above, the through holes (6a) penetrating the bottom surface of the first moving carriage 6 in the substantially vertical direction are formed with the first moving carriage 6. With provision of the through holes (6a), the attachment works can be performed while visually checking the positional relation between the first support surfaces 44 and the timing belts 21 from the above.

The clamp member 42 is secured to the first moving carriage 6 by the screw (48a) with the timing belt 21 and the flat belt 30 pinched between the first moving carriage 6 and the first and second protrusions 43, 45, respectively.

With the above-described construction, the timing belt 21 is pressed against the first support surface 44 by the comb-tooth-like members (41A) with the timing belt 21 pressed and bent into the gap between the comb-tooth-like members (41A) by the first protrusion 43. Further, the flat belt 30 is pressed against the second support surface 46 by the comb-tooth-like members (41B) with the flat belt 30 pressed and bent into the gap between the comb-tooth-like members (41B) by the second protrusion 45. Thereby, the timing belt 21 is pinched between the comb-tooth-like members (41A) and the first support surface 44, and the flat belt 30 is pinched between the comb-tooth-like members (41B) and the second support surface 46.

According to the present embodiment, after positioning the timing belt 21 and the flat belt 30 in a condition that the clamp member 42 is temporarily held by the clamp member holding members 50, the timing belt 21 and the flat belt 30 are clamped to the first moving carriage 6 by securing the clamp member 42 to the first moving carriage 6 by the screw (48a). Thus, the assembly work can be simplified.

In this embodiment, the clamp member 42 is constructed of a single part having the first support surface 44 and the second support surface 46. The clamp member 42 can be secured to the first moving carriage 6 simply by engaging the screw (48a) into the screw hole 48 formed between the first support surface 44 and the second support surface 46, and the timing belt 21 and the flat belt 30 can be clamped to the first moving carriage 6 by substantially the same forces. Therefore, a smaller number of construction parts is used, and the assembly work can be simplified.

FIG. 8B is a schematic enlarged view of the comb-tooth-like members (41A), and FIG. 8C is a schematic enlarged view of the comb-tooth-like members (41B). As illustrated in FIG. 8B, the comb-tooth-like members (41A) respectively include inside surfaces (F) opposite to each other spaced apart by the gap and bottom surfaces (G) that face the timing belt 21. Further, as illustrated in FIG. 8C, the comb-tooth-like members (41B) respectively include inside surfaces (H) opposite to each other spaced apart by the gap and bottom surfaces (I) that face the flat belt 30. In the comb-tooth-like members (41A), the inside surface (F) is substantially perpendicular to the bottom surface (G). In the comb-tooth-like members (41B), the inside surface (H) is substantially perpendicular to the bottom surface (I).

From a practical standpoint, in mass production, it is difficult to form the inside surfaces (F, H) perpendicular to the bottom surfaces (G, I), respectively. Therefore, in this embodiment, when the inside surfaces (F, H) respectively connect to the bottom surfaces (G, I) while having a curvature of R2 or less, it is considered that the inside surfaces (F, H) are formed perpendicular to the bottom surfaces (G, I), respectively.

By forming the inside surfaces (F, H) and the bottom surfaces (G, I) as above, the comb-tooth-like members (41A, 41B) strongly press the timing belt 21 and the flat belt 30 against the first and second support surfaces (44, 46), respectively. As a result, the timing belt 21 and the flat belt 30 can be firmly clamped to the first moving carriage 6.

With the above-described belt clamp mechanism 40, even if the forces in the direction of hindering the movements of the timing belts 21 and the flat belts 30 are produced due to the inertial forces of the first and second moving carriages 6, 9 when the operational condition of the drive motor 10 is switched, for example, between rotation and halt, forward rotation and reverse rotation, etc., the slippage of the timing belt 21 between the pair of comb-tooth-like members (41A) and the slippage of the flat belt 30 between the pair of comb-tooth-like members (41B) are effectively prevented. Accordingly, the engagement position of the timing belt 21 to the first moving carriage 6 and the engagement position of the flat belt 30 to the first moving carriage 6 can remain without shifting. As a result, the positional relation between the first moving carriage 6 and the second moving carriage 9 is accurately kept, so that a good quality image without deformation can be obtained.

Figure 13:
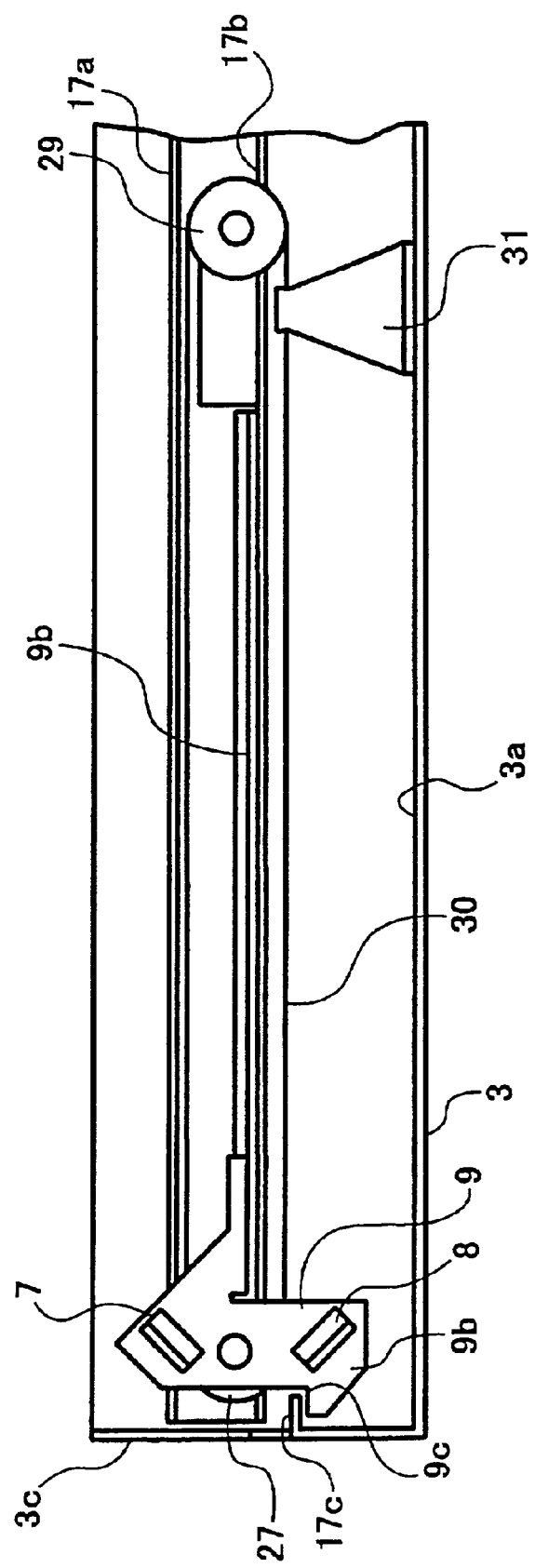
FIG. 13 is a side view of the optical scanning device when a second moving carriage is located at the home position.

FIG. 13 is a side view of the optical scanning device 1 when the second moving carriage 9 is located at the home position. When the second moving carriage 9 is located at the home position, the flat belt 30 is fixed relatively to the bottom plate (3a) of the housing 3 by the fixing member 31 in the vicinity of the flat pulley 29 provided at the right side part of the second moving carriage 9 as viewed in FIG. 13. Therefore, the right side part of the second moving carriage 9, i.e., the tip end side of the arm (9b), does not move greatly in the vertical direction. Further, at the left side part of the second moving carriage 9 as viewed in FIG. 13, the arm portion (9c) in L shape is formed at a lower side of the mirror stay (9a). Moreover, as described above, the stopper (17c) is formed with the wall (3c) of the housing 3 by cutting a part of the wall (3c) and being raised from the plane of the wall (3c) at a position corresponding to the arm portion (9c) formed with the mirror stay (9a), so as to regulate the movement of the second moving carriage 9 in a substantially vertical direction. With the above-described construction, the optical scanning device 1 is prevented from being broken due to vibration and impact caused during the conveyance of the optical scanning device 1.

Therefore, when the optical scanning device 1 is shipped or conveyed, the first moving carriage 6 and the second moving carriage 9 are located at respective home positions to prevent the breakage of the optical scanning device 1.

Specifically, when the first moving carriage 6 is located at the home position, the first moving carriage 6 is engaged to the timing belt 21 in the vicinity of the driven timing pulley 24 fixed to the housing 3. In this condition, the movement of the first moving carriage 6 in substantially vertical direction due to vibration and impact is regulated, so that the breakage of the optical scanning device 1 is prevented. Further, as described above, the timing belt 21 is driven by the drive motor 10 including the stepping motor. Because the rotation of the drive motor 10 is stopped by detent torque, the first moving carriage 6 is prevented from moving unintentionally, so that the breakage of the optical scanning device 1 is prevented.

Like the first moving carriage 6, the second moving carriage 9 is in a fixed condition as the flat belt 30 is engaged to the first moving carriage 6. Further, as described above, the movements of the second moving carriage 9 in the substantially vertical direction at the right and left side parts of the second moving carriage 9 in FIG. 13 are regulated by the fixing of the flat belt 30 by the fixing member 31, and by the engagement of the arm (9c) and the stopper (17c). Thereby, the breakage of the optical scanning device 1 due to vibration and impact during the conveyance of the optical scanning device 1 is prevented. The above-described construction that regulates the movements of the first moving carriage 6 and the second moving carriage 9 in the substantially vertical direction is especially advantageous in the device having a relatively long construction in the sub-scanning direction, e.g., the arm (9b) of the second moving carriage 9 whose amount of the movements tends to be relatively great.

With the above-described simple engagement construction by use of the part of the second moving carriage 9, i.e., the arm portion (9c) in L shape, and the part of the housing 3, i.e., the stopper (17c), the optical scanning device 1 can be at low cost without using exclusive parts.

The above-described optical scanning device 1 employs a dual side driving system in which the timing belts 21, the flat belts 30, etc. are respectively arranged at both sides of the optical scanning device 1 in the main scanning direction. Alternatively, the optical scanning device 1 may employ a single side driving system in which the timing belt 21, the flat belt 30, etc. are arranged at one side of the optical scanning device 1 in the main scanning direction, and a guide rod is provided at the other side of the optical scanning device 1 in the main scanning direction.

Next, another embodiment of the present invention will be described referring to FIG. 14, in which the above-described optical scanning device 1 is used in an image forming apparatus such as a copying machine.

Figure 14:
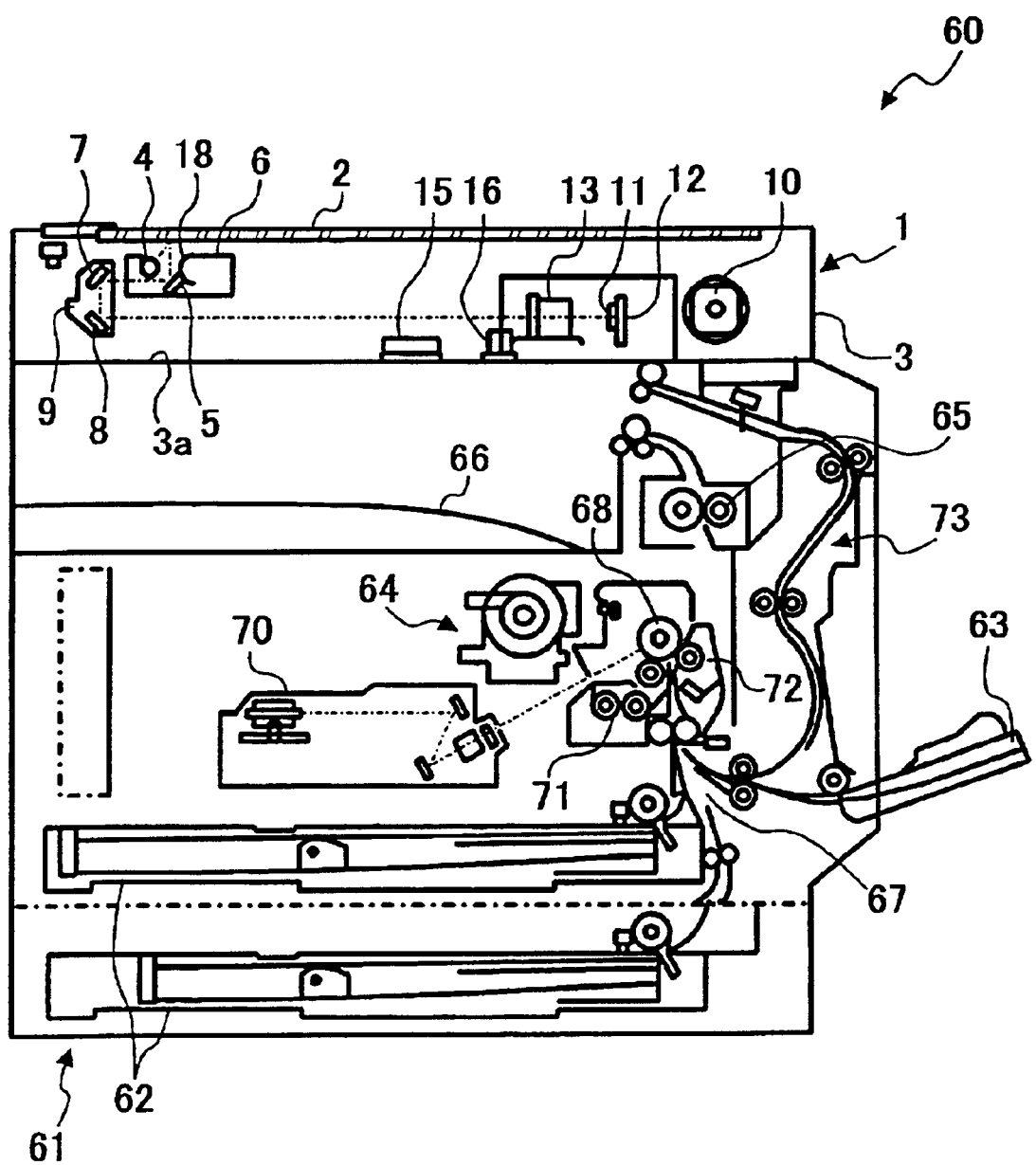
FIG. 14 is a schematic vertical longitudinal sectional side view of a copying machine according to another embodiment of the present invention.
Figure 15:
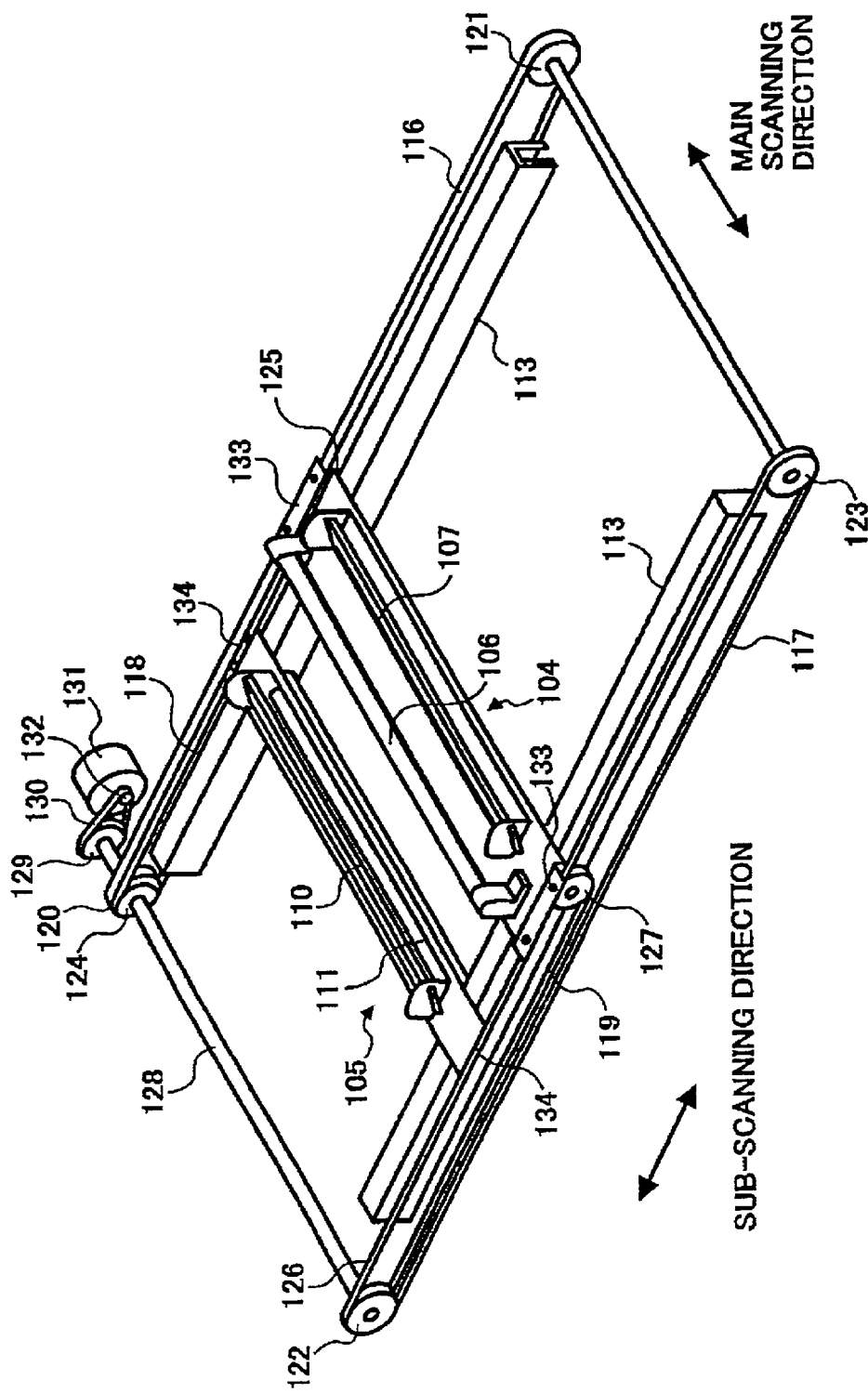
FIG. 15 is a schematic perspective view of an optical scanning device employing a belt driving system according to a background art.

FIG. 14 is a schematic vertical longitudinal sectional side view of a copying machine according to another embodiment of the present invention. A copying machine 60 includes the above-described optical scanning device 1 at an upper part thereof, and a printer device 61 that forms an image on an original document scanned and read by the optical scanning device 1 on a sheet. In the printer device 61, a sheet is fed to an electrophotographic printer engine 64 through a sheet conveying path 67 from one of a sheet feeding tray 62 that accommodates a stack of sheets therein and a manual sheet feeding tray 63 that manually feeds sheets. The sheet fed to the electrophotographic printer engine 64 is further conveyed to a sheet discharging stacker section 66 via a fixing device 65 through the sheet conveying path 67.

In this embodiment, the electrophotographic printer engine 64 includes an organic photoreceptor 68, and a charging device (not shown), an optical writing device 70, a developing device 71, and a transfer device 72 arranged around the photoreceptor 68. The printer device 61 further includes a sheet reversing mechanism 73 that reverses a sheet having an image on one side of the sheet.

An image is formed by the printer device 61 by an electrophotographic image forming process. A brief description will be made to an exemplary electrophotographic image forming process of the printer device 61.

The image data on an original document read by the optical scanning device 1 are sent to the printer device 61.

The optical writing device 70 converts the image data from the optical scanning device 1 into optical signals, and exposes the surface of the photoreceptor 68 uniformly charged by the charging device with the optical signals to form an electrostatic latent image corresponding to the image on the original document. The electrostatic latent image on the photoreceptor 68 is developed with toner by the developing device 71.

A toner image on the photoreceptor 68 is transferred to a sheet fed from one of the sheet feeding tray 62 and the manual sheet feeding tray 63. Subsequently, the toner image on the sheet is fixed thereonto by the fixing device 65. The sheet having the toner image is discharged to the sheet discharging stacker section 66 as a copy print.

In the copying machine 60 thus constructed, the printer device 61 forms an image based on an image on an original document scanned and read by the optical scanning device 1 in which the first moving carriage 6 and the second moving carriage 9 move in the sub-scanning direction at a speed ratio of 2 to 1 with accuracy, and the positional relation between the first moving carriage 6 and the second moving carriage 9 is accurately kept. Therefore, a good quality image without deformation can be formed on a sheet in the copying machine 60.

The present invention can be practiced in the digital type optical scanning device 1 including the CCD 11. However, the present invention may also be practiced in an analogue type optical scanning device. If the analogue type optical scanning device is used in the copying machine 60, for example, the photoreceptor 68 is exposed to a light reflected from the third mirror 8, passed through an imaging lens, and reflected by other reflection mirrors.

In the above embodiment of the present invention, the optical scanning device 1 is used in the copying machine 60 as an example of an image forming apparatus. Alternatively, the optical scanning device 1 may be used in other similar image forming apparatus such as a facsimile machine.

Numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. An optical scanning device, comprising:
    a housing;
    a first moving carnage carrying a light source provided to irradiate an image surface of an original document with light and a first mirror provided to reflect the light reflected from the image surface of the original document;
    a second moving carriage carrying at least one of a second mirror and a third mirror each provided to reflect the light reflected from the first mirror, the second moving carriage being configured to move in a sub-scanning direction at about one-half of a moving speed of the first moving carriage;
    a plurality of timing pulleys spaced apart in the sub-scanning direction and including at least a first timing pulley and a second timing pulley;
    a timing belt spanned around the first and second timing pulleys to reciprocate the first moving carriage in the sub-scanning direction;
    a drive device configured to drive the first timing pulley to rotate;
    a plurality of flat pulleys rotatably supported by the second moving carriage and spaced apart in the sub-scanning direction by a distance corresponding to a moving amount of the second moving carriage;
    a flat belt spanned around the plurality of flat pulleys to reciprocate the second moving carriage in the sub-scanning direction;
    an engaging member detachably engaging the timing belt and the flat belt to the first moving carriage; and
    a fixing member fixing the flat belt to the housing at a position different from a position where the flat belt is engaged to the first moving carriage by substantially half of a circumference of the flat belt;
    wherein the plurality of timing pulleys, timing belt, plurality of flat pulleys, flat belt, engaging member, and fixing member are provided at each side of the first and second moving carriages in the main scanning direction.

2. The optical scanning device according to claim 1, wherein the engaging member is engaging the timing belt and the flat belt to the first moving carriage at a substantially equal height.

3. The optical scanning device according to claim 1, further comprising a first rail on which the first moving carriage moves in the sub-scanning direction, wherein the first moving carriage is pressed against the first rail by the timing belt and the flat belt via the engaging member.

4. The optical scanning device according to claim 3, further comprising a second rail on which the second moving carriage moves in the sub-scanning direction, wherein the second moving carriage is pressed against the second rail by the flat belt via the fixing member.

5. The optical scanning device according to claim 4, wherein the optical scanning device has a two-step rail structure in which the first rail is positioned at an upper step and the second rail is positioned at a lower step.

6. The optical scanning device according to claim 1, wherein the flat belt is positioned at an inner side of the timing belt in the main scanning direction in the housing.

7. An optical scanning device, comprising:
    a moving carriage carrying an exposure optical system;
    a timing belt positioned along a sub-scanning direction to reciprocate the moving carriage in the sub-scanning direction; and
    a belt clamp mechanism detachably clamping the timing belt to the moving carriage, the belt clamp mechanism including;
        a plurality of comb-tooth members provided to a lower surface of the moving carriage spaced apart in the sub-scanning direction by a gap such that the plurality of comb-tooth members protrude from the lower surface of the moving carriage toward the timing belt; and
        a clamp member having a support surface having a protrusion protruding toward the gap between the plurality of comb-tooth members;
    wherein the clamp member is secured to the moving carriage such that the clamp member opposes the plurality of comb-tooth members via the timing belt while the protrusion on the support surface pressing the timing belt into the gap between the plurality of comb-tooth members.

8. The optical scanning device according to claim 7, wherein:
    the plurality of comb-tooth members each have a portion facing the timing belt; and
    the portion facing the timing belt is longer than a width of the timing belt in a main scanning direction.

9. The optical scanning device according to claim 7, wherein:
the plurality of comb-tooth members include inside surfaces and bottom surfaces, respectively, the inside surfaces facing to each other and spaced apart by the gap, the bottom surfaces facing the timing belt; and
the inside surfaces are substantially perpendicular to the bottom surfaces, respectively.

10. The optical scanning device according to claim 7, wherein:
the moving carriage includes a plurality of clamp member holding members detachably holding the clamp member, the plurality of clamp member holding members protruding from the lower surface of the moving carriage spaced apart in the sub-scanning direction by a distance substantially equal to a length of the clamp member in the sub-scanning direction;
the plurality of clamp member holding members have tip ends bent inwardly facing each other and spaced apart by a distance smaller than the length of the clamp member in the sub-scanning direction; and
at least one of the plurality of clamp member holding members has a concave portion dented in a direction away from an opposite one of the clamp member holding members.

11. An optical scanning device, comprising:
a housing;
a first moving carriage carrying a light source provided to irradiate an image surface of an original document with light and a first mirror provided to reflect the light reflected from the image surface of the original document;
a second moving carriage carrying at least one of a second mirror and a third mirror each provided to reflect the light reflected from the first mirror, the second moving carriage being configured to move in a sub-scanning direction at about one-half of a moving speed of the first moving carriage;
a timing belt positioned along the sub-scanning direction to reciprocate the first moving carriage in the sub-scanning direction;
a plurality of flat pulleys rotatably supported by the second moving carriage and spaced apart in the sub-scanning direction by a distance corresponding to a moving amount of the second moving carriage;
a flat belt spanned around the plurality of flat pulleys along the sub-scanning direction to reciprocate the second moving carriage in the sub-scanning direction, the flat belt being positioned at a side of the timing belt in a main scanning direction;
a fixing member fixing the flat belt to the housing at a position not interfering with reciprocating motions of the second moving carriage; and
a belt clamp mechanism detachably clamping the timing belt and the flat belt to the first moving carriage, the belt clamp mechanism including;
a first plurality of comb-tooth members provided to a lower surface of the first moving carriage spaced apart in the sub-scanning direction by a gap such that the first plurality of comb-tooth members protrude from the lower surface of the first moving carriage toward the timing belt;
a second plurality of comb-tooth members provided to the lower surface of the first moving carriage spaced apart in the sub-scanning direction by a gap such that the second plurality of comb-tooth members protrude from the lower surface of the first moving carriage toward the flat belt; and
a clamp member having a first support surface having a first protrusion protruding toward the gap between the first plurality of comb-tooth members, and a second support surface having a second protrusion protruding toward the gap between the second plurality of comb-tooth members;
wherein the clamp member is detachably secured to the first moving carriage such that the clamp member opposes the first and second pluralities of comb-tooth members via the timing belt and the flat belt, respectively, while the first protrusion on the first support surface pressing the timing belt into the gap between the first plurality of comb-tooth members and while the second protrusion on the second support surface pressing the flat belt into the gap between the second plurality of comb-tooth members.

12. The optical scanning device according to claim 11, wherein:
the first plurality of comb-tooth members each have a portion facing the timing belt;
the portion facing the timing belt is longer than a width of the timing belt in the main scanning direction;
the second plurality of comb-tooth members each have a portion facing the flat belt; and
the portion facing the flat belt is longer than a width of the flat belt in the main scanning direction.

13. The optical scanning device according to claim 11, wherein:
the clamp member includes a flat plate member with which the first and second support surfaces are provided in a diagonal relation; and
the clamp member is detachably secured to the first moving carriage at a substantially central part of the flat plate member between the first and second support surfaces.

14. The optical scanning device according to claim 11, wherein:
the first plurality of comb-tooth members include inside surfaces and bottom surfaces, respectively, the inside surfaces facing to each other and spaced apart by the gap, the bottom surfaces facing the timing belt;
the second plurality of comb-tooth members include inside surfaces and bottom surfaces, respectively, the inside surfaces facing to each other and spaced apart by the gap, the bottom surfaces facing the flat belt;
the inside surfaces of the first plurality of comb-tooth members are substantially perpendicular to the bottom surfaces of the first plurality of comb-tooth members, respectively; and
the inside surfaces of the second plurality of comb-tooth members are substantially perpendicular to the bottom surfaces of the second plurality of comb-tooth members, respectively.

15. The optical scanning device according to claim 11, wherein:
the first moving carriage includes a plurality of clamp member holding members detachably holding the clamp member;
the plurality of clamp member holding members protruding from the lower surface of the first moving carriage spaced apart in the sub-scanning direction by a distance substantially equal to a length of the clamp member in the sub-scanning direction;

the plurality of clamp member holding members have tip ends bent inwardly facing each other and spaced apart by a distance smaller than the length of the clamp member in the sub-scanning direction; and at least one of the plurality of clamp member holding members has a concave portion dented in a direction away from an opposite one of the clamp member holding members.

16. An image forming apparatus, comprising:

an optical scanning device configured to scan and read an image on an original document, the optical scanning device including:

a housing;

a first moving carriage carrying a light source provided to irradiate an image surface of an original document with light and a first mirror provided to reflect the light reflected from the image surface of the original document;

a second moving carriage carrying at least one of a second mirror and a third mirror each provided to reflect the light reflected from the first mirror, the second moving carriage configured to move in a sub-scanning direction at about one-half of a moving speed of the first moving carriage;

a plurality of timing pulleys spaced apart in the sub-scanning direction and including at least a first timing pulley and a second timing pulley;

a timing belt spanned around the first and second timing pulleys to reciprocate the first moving carriage in the sub-scanning direction;

a drive device configured to drive the first timing pulley to rotate;

a plurality of flat pulleys rotatably supported by the second moving carriage and spaced apart in the sub-scanning direction by a distance corresponding to a moving amount of the second moving carriage;

a flat belt spanned around the plurality of flat pulleys to reciprocate the second moving carriage in the sub-scanning direction;

an engaging member detachably engaging the timing belt and the flat belt to the first moving carriage; and a fixing member fixing the flat belt to the housing at a position different from a position where the flat belt is engaged to the first moving carriage by substantially half of a circumference of the flat belt;

wherein the plurality of timing pulleys, timing belt, plurality of flat pulleys, flat belt, engaging member, and fixing member are provided at each side of the first and second moving carriages in the main scanning direction; and a printer device configured to print the image of the original document scanned and read by the optical scanning device.

17. The image forming apparatus according to claim 16, wherein the engaging member is engaging the timing belt and the flat belt to the first moving carriage at a substantially equal height.

18. The image forming apparatus according to claim 16, wherein:

the optical scanning device further includes a first rail on which the first moving carriage moves in the sub-scanning direction; and the first moving carriage is pressed against the first rail by the timing belt and the flat belt via the engaging member.

19. The image forming apparatus according to claim 18, wherein:

the optical scanning device further includes a second rail on which the second moving carriage moves in the sub-scanning direction; and the second moving carriage is pressed against the second rail by the flat belt via the fixing member.

20. The image forming apparatus according to claim 19, wherein the optical scanning device has a two-step rail structure in which the first rail is positioned at an upper step and the second rail is positioned at a lower step.

21. The image forming apparatus according to claim 16, wherein the flat belt is positioned at an inner side of the timing belt in the main scanning direction in the housing.

22. An image forming apparatus, comprising:

an optical scanning device configured to scan and read an image on an original document, the optical scanning device including:

a moving carriage carrying an exposure optical system;

a timing belt positioned along a sub-scanning direction to reciprocate the moving carriage in the sub-scanning direction; and a belt clamp mechanism clamping the timing belt to the moving carriage, the belt clamp mechanism including:

a plurality of comb-tooth members provided to a lower surface of the moving carnage spaced apart in the sub-scanning direction by a gap such that the plurality of comb-tooth members protrude from the lower surface of the moving carriage toward the timing belt; and a clamp member having a support surface having a protrusion protruding toward the gap between the plurality of comb-tooth members;

wherein the clamp member is detachably secured to the moving carriage such that the clamp member opposes the plurality of comb-tooth members via the timing belt while the protrusion on the support surface pressing the timing belt into the gap between the plurality of comb-tooth members; and a printer device configured to print the image on the original document scanned and read by the optical scanning device.

23. The image forming apparatus according to claim 22, wherein:

the plurality of comb-tooth members each have a portion facing the timing belt; and the portion facing the timing belt is longer than a width of the timing belt in a main scanning direction.

24. The image forming apparatus according to claim 22, wherein:

the plurality of comb-tooth members include inside surfaces and bottom surfaces, respectively, the inside surfaces facing to each other and spaced apart by the gap, the bottom surfaces facing the timing belt; and the inside surfaces are substantially perpendicular to the bottom surfaces, respectively.

25. The image forming apparatus according to claim 22, wherein:

the moving carriage includes a plurality of clamp member holding members detachably holding the clamp member;

the plurality of clamp member holding members protruding from the lower surface of the moving carriage spaced apart in the sub-scanning direction by a distance substantially equal to a length of the clamp member in the sub-scanning direction;

the plurality of clamp member holding members have tip ends bent inwardly facing each other and spaced apart by a distance smaller than the length of the clamp member in the sub-scanning direction; and at least one of the plurality of clamp member holding members has a concave portion dented in a direction away from an opposite one of the clamp member holding members.

26. An image forming apparatus, comprising:

an optical scanning device configured to scan and read an image on an original document, the optical scanning device including:

a housing;

a first moving carriage carrying a light source provided to irradiate an image surface of an original document with light and a first mirror provided to reflect the light reflected from the image surface of the original document;

a second moving carnage carrying at least one of a second mirror and a third mirror each provided to reflect the light reflected from the first mirror, the second moving carriage being configured to move in a sub-scanning direction at about one-half of a moving speed of the first moving carriage;

a timing belt positioned along the sub-scanning direction to reciprocate the first moving carriage in the sub-scanning direction;

a plurality of flat pulleys rotatably supported by the second moving carriage and spaced apart in the sub-scanning direction by a distance corresponding to a moving amount of the second moving carriage;

a flat belt spanned around the plurality of flat pulleys along the sub-scanning direction to reciprocate the second moving carriage in the sub-scanning direction, the flat belt being arranged at a side of the timing belt in a main scanning direction;

a fixing member fixing the flat belt to the housing at a position not interfering with reciprocating motions of the second moving carriage; and a belt clamp mechanism detachably clamping the timing belt and the flat belt to the first moving carriage, the belt clamp mechanism including:

a first plurality of comb-tooth members provided to a lower surface of the first moving carriage spaced apart in the sub-scanning direction by a gap such that the first plurality of comb-tooth members protrude from the lower surface of the first moving carriage toward the timing belt;

a second plurality of comb-tooth members provided to the lower surface of the first moving carriage spaced apart in the sub-scanning direction by a gap such that the second plurality of comb-tooth members protrude from the lower surface of the first moving carriage toward the flat belt; and a clamp member having a first support surface having a first protrusion protruding toward the gap between the first plurality of comb-tooth members, and a second support surface having a second protrusion protruding toward the gap between the second plurality of comb-tooth members;

wherein the clamp member is detachably secured to the first moving carriage such that the clamp member opposes the first and second pluralities of comb-tooth members via the timing belt and the flat belt, respectively, while the first protrusion on the first support surface pressing the timing belt into the gap between the first plurality of comb-tooth members and while the second protrusion on the second support surface pressing the flat belt into the gap between the second plurality of comb-tooth members; and a printer device configured to print the image of the original document scanned and read by the optical scanning device.

27. The image forming apparatus according to claim 26, wherein:

the first plurality of comb-tooth members each have a portion facing the timing belt;

the portion facing the timing belt is longer than a width of the timing belt in the main scanning direction;

the second plurality of comb-tooth members each have a portion facing the flat belt; and the portion facing the flat belt is longer than a width of the flat belt in the main scanning direction.

28. The image forming apparatus according to claim 26, wherein:

the clamp member includes a flat plate member with which the first and second support surfaces are provided in a diagonal relation; and the clamp member is detachably secured to the first moving carriage at a substantially central part of the flat plate member between the first and second support surfaces.

29. The image forming apparatus according to claim 26, wherein:

the first plurality of comb-tooth members include inside surfaces and bottom surfaces, respectively, the inside surfaces facing to each other and spaced apart by the gap, the bottom surfaces facing the timing belt;

the second plurality of comb-tooth members include inside surfaces and bottom surfaces, respectively, the inside surfaces facing to each other and spaced apart by the gap, the bottom surfaces facing the flat belt;

the inside surfaces of the first plurality of comb-tooth members are substantially perpendicular to the bottom surfaces of the first plurality of comb-tooth members, respectively; and the inside surfaces of the second plurality of comb-tooth members are substantially perpendicular to the bottom surfaces of the second plurality of comb-tooth members, respectively.

30. The image forming apparatus according to claim 26, wherein:

the first moving carriage includes a plurality of clamp member holding members detachably holding the clamp member;

the plurality of clamp member holding members protruding from the lower surface of the first moving carriage spaced apart in the sub-scanning direction by a distance substantially equal to a length of the clamp member in the sub-scanning direction;

the plurality of clamp member holding members have tip ends bent inwardly facing each other and spaced apart by a distance smaller than the length of the clamp member in the sub-scanning direction; and at least one of the plurality of clamp member holding members has a concave portion dented in a direction away from an opposite one of the clamp member holding members.

31. An optical scanning device, comprising:

a housing;

first carrying means for carrying a light source provided to irradiate an image surface of an original document with light and a first mirror provided to reflect the light reflected from the image surface of the original document;

second carrying means for carrying at least one of a second mirror and a third mirror each provided to reflect the light reflected from the first mirror, the second carrying means being capable of moving in a sub-scanning direction at about one-half of a moving speed of the first carrying means;

a plurality of timing pulleys spaced apart in the sub-scanning direction and including at least a first timing pulley and a second timing pulley;

a timing belt spanned around the first and second timing pulleys to reciprocate the first carrying means in the sub-scanning direction;

driving means for driving the first timing pulley to rotate;

a plurality of flat pulleys rotatably supported by the second carrying means and spaced apart in the sub-scanning direction by a distance corresponding to a moving amount of the second carrying means;

a flat belt spanned around the plurality of flat pulleys to reciprocate the second carrying means in the sub-scanning direction;

engaging means for engaging the timing belt and the flat belt to the first carrying means; and fixing means for fixing the flat belt to the housing at a position different from a position where the flat belt is engaged to the first carrying means by substantially half of a circumference of the flat belt;

wherein the plurality of timing pulleys, timing belt, plurality of flat pulleys, flat belt, engaging means, and fixing means are provided at each side of the first and second carrying means in the main scanning direction.

32. An optical scanning device, comprising:

first carrying means for carrying an exposure optical system;

second carrying means for carrying an optical system;

a timing belt positioned along a sub-scanning direction to reciprocate the first carrying means in the sub-scanning direction;

a flat belt positioned parallel to the timing belt to reciprocate the second carrying means in the sub-scanning direction; and clamping means for clamping the timing belt and flat belt to the first carrying means.

33. An optical scanning device, comprising:

a housing;

first carrying means for carrying a light source provided to irradiate an image surface of an original document with light and a first mirror provided to reflect the light reflected from the image surface of the original document;

second carrying means for carrying at least one of a second mirror and a third mirror each provided to reflect the light reflected from the first mirror, the second carrying means being capable of moving in a sub-scanning direction at about one-half of a moving speed of the first carrying means;

a timing belt positioned along the sub-scanning direction to reciprocate the first carrying means in the sub-scanning direction;

a plurality of flat pulleys rotatably supported by the second carrying means and spaced apart in the sub-scanning direction by a distance corresponding to a moving amount of the second carrying means;

a flat belt spanned around the plurality of flat pulleys along the sub-scanning direction to reciprocate the second carrying means in the sub-scanning direction, the flat belt being positioned at a side of the timing belt in a main scanning direction;

fixing means for fixing the flat belt to the housing at a position not interfering with reciprocating motions of the second carrying means; and clamping means for clamping the timing belt and the flat belt to the first carrying means.

34. An optical scanning device comprising:

a first moving carriage carrying an exposure optical system;

a second carriage carrying an optical system;

a timing belt positioned along a sub-scanning direction to reciprocate the first moving carriage in the sub-scanning direction;

a flat belt positioned parallel to the timing belt to reciprocate the second carrying means in the sub-scanning direction; and a clamping device detachably clamping the timing belt and flat belt to the first moving carriage.

* * * * *